(12) United States Patent
Tanaka et al.

(10) Patent No.: US 8,503,784 B2
(45) Date of Patent: Aug. 6, 2013

(54) IMAGE RECOGNITION APPARATUS, IMAGE RECOGNITION METHOD, AND STORAGE MEDIUM RECORDING IMAGE RECOGNITION PROGRAM

(75) Inventors: Hiroshi Tanaka, Kawasaki (JP); Yusaku Fujii, Kawasaki (JP); Hiroaki Takebe, Kawasaki (JP); Yoshinobu Hotta, Kawasaki (JP); Akihiro Minagawa, Kawasaki (JP); Noriaki Ozawa, Kawasaki (JP); Katsuhito Fujimoto, Kawasaki (JP); Yoshio Fukasawa, Kawasaki (JP); Masaki Inami, Kawasaki (JP); Kiichiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1212 days.

(21) Appl. No.: 12/250,302

(22) Filed: Oct. 13, 2008

(65) Prior Publication Data
US 2009/0110282 A1 Apr. 30, 2009

(30) Foreign Application Priority Data
Oct. 31, 2007 (JP) ................................. 2007-284294

(51) Int. Cl.
G06K 9/00 (2006.01)
(52) U.S. Cl.
USPC ......................................................... 382/181
(58) Field of Classification Search
USPC ................................................. 382/181, 189
See application file for complete search history.

(56) References Cited

U.S. PATENT DOCUMENTS

| | | | | |
|---|---|---|---|---|
| 6,567,546 B1 * | 5/2003 | Eguchi et al. | ................. | 382/181 |
| 6,721,451 B1 * | 4/2004 | Ishitani | ......................... | 382/181 |
| 6,832,726 B2 * | 12/2004 | Torchalski | ............... | 235/462.25 |
| 7,639,846 B2 * | 12/2009 | Yoda | .............................. | 382/118 |
| 2003/0156754 A1 * | 8/2003 | Ouchi | ........................... | 382/176 |
| 2003/0215137 A1 * | 11/2003 | Wnek | ........................... | 382/181 |

FOREIGN PATENT DOCUMENTS

| CN | 1848109 A | 10/2006 |
|---|---|---|
| JP | A 5-158605 | 6/1993 |
| JP | 7-192095 | 7/1995 |
| JP | 8-194772 | 7/1996 |
| JP | 2007-222747 | 9/2007 |

OTHER PUBLICATIONS

Chinese Office Action issued in Chinese App. No. 200810170687.8 dated Oct. 27, 2010.

(Continued)

Primary Examiner — Edward Park
(74) Attorney, Agent, or Firm — Greer, Burns & Crain, Ltd.

(57) ABSTRACT

An image recognition apparatus recognizes the correspondence between character strings and logical elements composing a logical structure in an image in which the character strings are described as the logical elements to recognize each logical element. The image recognition apparatus includes outputting means for outputting the recognized logical elements when the correspondence is recognized or re-recognized; first determining means for determining a certain logical element to be correct when input of a determination request to determine the logical element is received from a user; second determining means for determining the correctness of all the logical elements output before the logical element determined by the first determining means and is positioned according to confirmation by the user; and re-recognizing means for re-recognizing the correspondence between logical elements that have not been determined to be correct and the character strings on the basis of the determination content for each logical element.

6 Claims, 23 Drawing Sheets

OTHER PUBLICATIONS

Chinese Office Action issued in Chinese App. No. 200810170687.8 dated Jun. 9, 2011.

Fujimoto et al, "Document Image Recognition for e-Documents and Internal Control", Fujitsu, Fujitsu Limited, May 10, 2007, vol. 58, No. 3, pp. 176-182.

Japanese Office Action and partial English translation issued in Japanese Application No. 2007-284294 on Jul. 17, 2012.

Japanese Office Action and English translation issued in Japanese Application No. 2007-284294 issued Feb. 19, 2013.

* cited by examiner

FIG. 3

| | Application | |
|---|---|---|
| | Name | David Smith |
| Office | Address | 111 11th Avenue East, Suite 11, Seattle, WA |
| | TEL No. | 888-444-5555 |
| Home | Address | 111 Apple Street, #111, Seattle, WA |
| | TEL No. | 999-666-1111 |

FIG. 5A

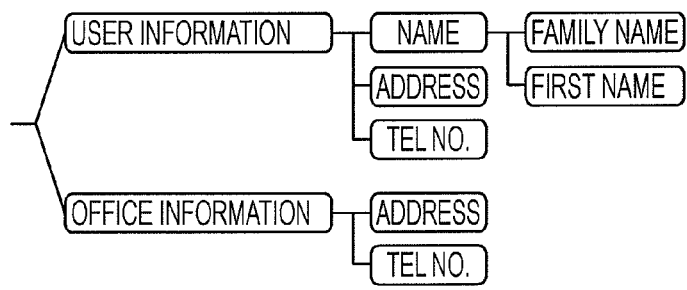

FIG. 5B

| ID | | HIERARCHY | PARENT | POSITION | ATTRIBUTE | DATA | | |
|---|---|---|---|---|---|---|---|---|
| 1 | USER INFORMATION | 0 | 0 | 7 : LOWER | GROUP | | | |
| 2 | NAME | 1 | 1 | | GROUP | | | |
| 3 | ADDRESS | 1 | 1 | 4 : RIGHT, LOWER | NODE | CHARACTER STRING | NUMBER STRING | "-" |
| 4 | TEL NO. | 1 | 1 | 3 : LEFT, UPPER | NODE | NUMBER STRING | "-" | |
| 5 | FAMILY NAME | 2 | 2 | 6 : RIGHT | NODE | CHARACTER STRING | | |
| 6 | FIRST NAME | 2 | 2 | 5 : LEFT | NODE | CHARACTER STRING | | |
| 7 | OFFICE INFORMATION | 0 | 0 | 1 : UPPER | GROUP | | | |
| 8 | ADDRESS | 1 | 7 | 9 : RIGHT, LOWER | NODE | CHARACTER STRING | NUMBER STRING | "-" |
| 9 | TEL NO. | 1 | 7 | 8 : LEFT, UPPER | NODE | NUMBER STRING | "-" | |
| ⋮ | ⋮ | ⋮ | ⋮ | ⋮ | ⋮ | ⋮ | ⋮ | ⋮ |

FIG. 6

| Type of Logical Element | | | Candidate for Character String | | | |
|---|---|---|---|---|---|---|
| | | | FIRST CANDIDATE | SECOND CANDIDATE | THIRD CANDIDATE | FOURTH CANDIDATE |
| USER INFORMATION | NAME | FAMILY NAME | SMITH | - | - | - |
| | | FIRST NAME | DAVID | DEVID | - | - |
| | ADDRESS | | 777 11TH AVENUE EAST, SUITE 11, SEATTLE, WA | 111 11TH AVENUE EAST, SUITE 11, SEATTLE, WA | 777 APPLE STREET, #111, SEATTLE, WA | 111 APPLE STREET, #111, SEATTLE, WA |
| | TEL NO. | | 888-444-5555 | 888-111-5555 | 999-666-7777 | 999-666-1111 |
| OFFICE INFORMATION | ADDRESS | | 777 APPLE STREET, #111, SEATTLE, WA | 111 APPLE STREET, #111, SEATTLE, WA | 777 11TH AVENUE EAST, SUITE 11, SEATTLE, WA | 111 11TH AVENUE EAST, SUITE 11, SEATTLE, WA |
| | TEL NO. | | 999-666-7777 | 999-666-1111 | 888-444-5555 | 888-111-5555 |

FIG. 8A

| TYPE OF LOGICAL ELEMENT | | | CANDIDATE FOR CHARACTER STRING | | | |
|---|---|---|---|---|---|---|
| | | | FIRST CANDIDATE | SECOND CANDIDATE | THIRD CANDIDATE | FOURTH CANDIDATE |
| USER INFORMATION | NAME | FAMILY NAME | SMITH | - | - | - |
| | | FIRST NAME | DAVID | - | - | - |
| | ADDRESS | | 111 APPLE STREET #111, SEATTLE, WA | - | - | - |
| | TEL NO. | | 888-444-5555 | 888-111-5555 | 999-666-7777 | 999-666-1111 |
| OFFICE INFORMATION | ADDRESS | | 777 APPLE STREET, #111, SEATTLE, WA | 111 APPLE STREET, #111, SEATTLE, WA | 777 11TH AVENUE EAST, SUITE 11, SEATTLE, WA | 111 11TH AVENUE EAST, SUITE 11, SEATTLE, WA |
| | TEL NO. | | 999-666-7777 | 999-666-1111 | 888-444-5555 | 888-111-5555 |

FIG. 8B

| TYPE OF LOGICAL ELEMENT | | | CANDIDATE FOR CHARACTER STRING | | | |
|---|---|---|---|---|---|---|
| | | | FIRST CANDIDATE | SECOND CANDIDATE | THIRD CANDIDATE | FOURTH CANDIDATE |
| USER INFORMATION | NAME | FAMILY NAME | SMITH | - | - | - |
| | | FIRST NAME | DAVID | - | - | - |
| | ADDRESS | | 111 APPLE STREET #111, SEATTLE, WA | - | - | - |
| | TEL NO. | | 999-666-7777 | 999-666-1111 | - | - |
| OFFICE INFORMATION | ADDRESS | | 777 11TH AVENUE EAST, SUITE 11, SEATTLE, WA | 111 11TH AVENUE EAST, SUITE 11, SEATTLE, WA | - | - |
| | TEL NO. | | 888-444-5555 | 888-111-5555 | - | - |

FIG. 8C

| TYPE OF LOGICAL ELEMENT | | | CANDIDATE FOR CHARACTER STRING | | | |
|---|---|---|---|---|---|---|
| | | | FIRST CANDIDATE | SECOND CANDIDATE | THIRD CANDIDATE | FOURTH CANDIDATE |
| USER INFORMATION | NAME | FAMILY NAME | SMITH | | - | - |
| | | FIRST NAME | DAVID | | - | - |
| | ADDRESS | | 111 APPLE STREET #111, SEATTLE, WA | | - | - |
| | TEL NO. | | 999-666-1111 | - | - | - |
| OFFICE INFORMATION | ADDRESS | | 777 11TH AVENUE EAST, SUITE 11, SEATTLE, WA | 111 11TH AVENUE EAST, SUITE 11, SEATTLE, WA | - | - |
| | TEL NO. | | 888-444-5555 | 888-111-5555 | - | - |

FIG. 8D

| TYPE OF LOGICAL ELEMENT | | | CANDIDATE FOR CHARACTER STRING | | | |
|---|---|---|---|---|---|---|
| | | | FIRST CANDIDATE | SECOND CANDIDATE | THIRD CANDIDATE | FOURTH CANDIDATE |
| USER INFORMATION | NAME | FAMILY NAME | SMITH | | - | - |
| | | FIRST NAME | DAVID | | - | - |
| | ADDRESS | | 111 APPLE STREET #111, SEATTLE, WA | | - | - |
| | TEL NO. | | 999-666-1111 | - | - | - |
| OFFICE INFORMATION | ADDRESS | | 777 11TH AVENUE EAST, SUITE 11, SEATTLE, WA | 111 11TH AVENUE EAST, SUITE 11, SEATTLE, WA | - | - |
| | TEL NO. | | 888-444-5555 | 888-111-5555 | - | - |

FIG. 9A

| ID | | HIERARCHY | PARENT | POSITION | ATTRIBUTE | DATA | | |
|---|---|---|---|---|---|---|---|---|
| 1 | USER INFORMATION | 0 | 0 | 7 : LOWER | GROUP | | | |
| 2 | NAME | 1 | 1 | | GROUP | | | |
| 3 | ADDRESS | 1 | 1 | 4 : RIGHT, LOWER | NODE | 111 APPLE STREET, #111, SEATTLE, WA | | |
| 4 | TEL NO. | 1 | 1 | 3 : LEFT, UPPER | NODE | NUMBER STRING | "-" | |
| 5 | FAMILY NAME | 2 | 2 | 6 : RIGHT | NODE | SMITH | | |
| 6 | FIRST NAME | 2 | 2 | 5 : LEFT | NODE | DAVID | | |
| 7 | OFFICE INFORMATION | 0 | 0 | 1 : UPPER | GROUP | | | |
| 8 | ADDRESS | 1 | 7 | 9 : RIGHT, LOWER | NODE | CHARACTER STRING | NUMBER STRING | "-" |
| 9 | TEL NO. | 1 | 7 | 8 : LEFT, UPPER | NODE | NUMBER STRING | "-" | |
| ⋮ | ⋮ | ⋮ | ⋮ | ⋮ | ⋮ | ⋮ | ⋮ | ⋮ |

FIG. 9B

| ID | | HIERARCHY | PARENT | POSITION | ATTRIBUTE | DATA | | |
|---|---|---|---|---|---|---|---|---|
| 1 | USER INFORMATION | 0 | 0 | 7 : LOWER | GROUP | | | |
| 2 | NAME | 1 | 1 | | GROUP | | | |
| 3 | ADDRESS | 1 | 1 | 4 : RIGHT, LOWER | NODE | 111 APPLE STREET, #111, SEATTLE, WA | | |
| 4 | TEL NO. | 1 | 1 | 3 : LEFT, UPPER | NODE | 999-666-1111 | | |
| 5 | FAMILY NAME | 2 | 2 | 6 : RIGHT | NODE | SMITH | | |
| 6 | FIRST NAME | 2 | 2 | 5 : LEFT | NODE | DAVID | | |
| 7 | OFFICE INFORMATION | 0 | 0 | 1 : UPPER | GROUP | | | |
| 8 | ADDRESS | 1 | 7 | 9 : RIGHT, LOWER | NODE | CHARACTER STRING | NUMBER STRING | "-" |
| 9 | TEL NO. | 1 | 7 | 8 : LEFT, UPPER | NODE | NUMBER STRING | "-" | |
| ⋮ | ⋮ | ⋮ | ⋮ | ⋮ | ⋮ | ⋮ | ⋮ | ⋮ |

FIG. 12

Application

Name | David Smith

Office
Address | 111 11th Avenue East, Suite 11, Seattle, WA
TEL No. | 888-444-5555

Home
Address | 111 Apple Street, #111, Seattle, WA
TEL No. | 999-666-1111

USER
NAME | DAVID SMITH | DETERMINATION
ADDRESS | 777 11TH AVENUE EAST, SUITE 11, SEATTLE, WA | DETERMINATION
TEL NO. | 888-444-5555 | DETERMINATION

OFFICE
ADDRESS | 777 Apple Street, #111, Seattle, WA | DETERMINATION
TEL NO. | 999-666-7777 | DETERMINATION

FIG. 13A

| | | |
|---|---|---|
| USER | | |
| NAME | DAVID SMITH | DETERMINATION |
| ADDRESS | 777 11TH AVENUE EAST, SUITE 11, SEATTLE, WA | DETERMINATION |
| TEL NO. | 88 | |

111 11TH AVENUE EAST, SUITE 11, SEATTLE, WA
777 APPLE STREET, #111, SEATTLE, WA
111 APPLE STREET, #111, SEATTLE, WA

| | | |
|---|---|---|
| OFFICE | | |
| ADDRESS | 777 APPLE STREET, #111, SEATTLE, WA | DETERMINATION |
| TEL NO. | 999-666-7777 | DETERMINATION |

DETERMINATION

FIG. 13B

| | | |
|---|---|---|
| USER | | |
| NAME | DAVID SMITH | DETERMINED |
| ADDRESS | 111 APPLE STREET, #111, SEATTLE, WA | DETERMINED |
| TEL NO. | 999-666-7777 | DETERMINATION |

| | | |
|---|---|---|
| OFFICE | | |
| ADDRESS | 111 11TH AVENUE EAST, SUITE 11, SEATTLE, WA | DETERMINATION |
| TEL NO. | 888-444-5555 | DETERMINATION |

DETERMINATION

FIG. 15A

| TYPE OF LOGICAL ELEMENT | | CANDIDATE FOR CHARACTER STRING | | | |
|---|---|---|---|---|---|
| | | FIRST CANDIDATE | SECOND CANDIDATE | THIRD CANDIDATE | FOURTH CANDIDATE |
| USER INFORMATION | NAME / FAMILY NAME | SMITH | - | - | - |
| | NAME / FIRST NAME | DAVID | - | - | - |
| | ADDRESS | 111 APPLE STREET, #111, SEATTLE, WA | - | - | - |
| | TEL NO. | 888-444-5555 | 888-111-5555 | 999-666-7777 | 999-666-1111 |
| OFFICE INFORMATION | ADDRESS | 777 APPLE STREET, #111, SEATTLE, WA | 111 APPLE STREET, #111, SEATTLE, WA | 777 11TH AVENUE EAST, SUITE 11, SEATTLE, WA | 111 11TH AVENUE EAST, SUITE 11, SEATTLE, WA |
| | TEL NO. | 999-666-7777 | 999-666-1111 | 888-444-5555 | 888-111-5555 |

FIG. 15B

| TYPE OF LOGICAL ELEMENT | | CANDIDATE FOR CHARACTER STRING | | | |
|---|---|---|---|---|---|
| | | FIRST CANDIDATE | SECOND CANDIDATE | THIRD CANDIDATE | FOURTH CANDIDATE |
| USER INFORMATION | NAME / FAMILY NAME | SMITH | - | - | - |
| | NAME / FIRST NAME | DAVID | - | - | - |
| | ADDRESS | 111 APPLE STREET, #111, SEATTLE, WA | - | - | - |
| | TEL NO. | 999-666-7777 (HIGHLIGHTED) | 999-666-1111 | - | - |
| OFFICE INFORMATION | ADDRESS | 111 11TH AVENUE EAST, SUITE 11, SEATTLE, WA (HIGHLIGHTED) | 777 11TH AVENUE EAST, SUITE 11, SEATTLE, WA | - | - |
| | TEL NO. | 888-444-5555 (HIGHLIGHTED) | 888-111-5555 | - | - |

FIG. 18A

```
USER
   NAME      DAVID SMITH                              [DETERMINATION]
   ADDRESS   777 11TH AVENUE EAST, SUITE 11, SEATTLE, WA [DETERMINATION]
   TEL NO.                           88 111 11TH AVENUE EAST, SUITE 11, SEATTLE, WA
                                        777 APPLE STREET, #111, SEATTLE, WA
                                        111 APPLE STREET, #111, SEATTLE, WA

OFFICE
   ADDRESS   777 APPLE STREET, #111, SEATTLE, WA      [DETERMINATION]
   TEL NO.               999-666-7777                 [DETERMINATION]

[DETERMINATION]
```

FIG. 18B

```
USER
   NAME      DAVID SMITH                              [DETERMINATION]
   ADDRESS   111 APPLE STREET, #111, SEATTLE, WA      DETERMINED
   TEL NO.               999-666-7777                 [DETERMINATION]

OFFICE
   ADDRESS   111 11TH AVENUE EAST, SUITE 11, SEATTLE, WA [DETERMINATION]
   TEL NO.               888-444-5555                 [DETERMINATION]

[DETERMINATION]
```

FIG. 19A

| TYPE OF LOGICAL ELEMENT | | CANDIDATE FOR CHARACTER STRING | | | |
|---|---|---|---|---|---|
| | | FIRST CANDIDATE | SECOND CANDIDATE | THIRD CANDIDATE | FOURTH CANDIDATE |
| USER INFORMATION | NAME / FAMILY NAME | SMITH | - | - | - |
| | NAME / FIRST NAME | DAVID | DEVID | - | - |
| | ADDRESS | 111 APPLE STREET #111, SEATTLE, WA | 111 APPLE STREET #111, SEATTLE, WA | - | - |
| | TEL NO. | 888-444-5555 | 888-111-5555 | 999-666-7777 | 999-666-1111 |
| OFFICE INFORMATION | ADDRESS | 777 APPLE STREET, #111, SEATTLE, WA | 111 APPLE STREET, #111, SEATTLE, WA | 777 11TH AVENUE EAST, SUITE 11, SEATTLE, WA | 111 11TH AVENUE EAST, SUITE 11, SEATTLE, WA |
| | TEL NO. | 999-666-7777 | 999-666-1111 | 888-444-5555 | 888-111-5555 |

FIG. 19B

| TYPE OF LOGICAL ELEMENT | | CANDIDATE FOR CHARACTER STRING | | | |
|---|---|---|---|---|---|
| | | FIRST CANDIDATE | SECOND CANDIDATE | THIRD CANDIDATE | FOURTH CANDIDATE |
| USER INFORMATION | NAME / FAMILY NAME | SMITH | - | - | - |
| | NAME / FIRST NAME | DAVID | DEVID | - | - |
| | ADDRESS | 111 APPLE STREET #111, SEATTLE, WA (HIGHLIGHTED) | - | - | - |
| | TEL NO. | 999-666-7777 (HIGHLIGHTED) | 999-666-1111 | - | - |
| OFFICE INFORMATION | ADDRESS | 111 11TH AVENUE EAST SUITE 11, SEATTLE, WA (HIGHLIGHTED) | 777 11TH AVENUE EAST, SUITE 11, SEATTLE, WA | - | - |
| | TEL NO. | 888-444-5555 (HIGHLIGHTED) | 888-111-5555 | - | - |

FIG. 21A

USER
- NAME: DAVID SMITH [DETERMINATION]
- ADDRESS: 777 11TH AVENUE EAST, SUITE 11, SEATTLE, WA [DETERMINATION]
  - 111 11TH AVENUE EAST, SUITE 11, SEATTLE, WA
  - 777 APPLE STREET, #111, SEATTLE, WA
  - 111 APPLE STREET, #111, SEATTLE, WA
- TEL NO.: 88...

OFFICE
- ADDRESS: 777 APPLE STREET, #111, SEATTLE, WA [DETERMINATION]
- TEL NO.: 999-666-7777 [DETERMINATION]

[DETERMINATION]

FIG. 21B

USER
- NAME: DAVID SMITH [DETERMINATION]
- ADDRESS: 111 APPLE STREET, #111, SEATTLE, WA [DETERMINED]
- TEL NO.: 888-444-5555 [DETERMINATION]
  - 999-666-7777
  - 999-666-1111

OFFICE
- ADDRESS: 777 APPLE STREET, #111, SEATTLE, WA [DETERMINATION]
- TEL NO.: 999-666-7777 [DETERMINATION]

[DETERMINATION]

IMAGE RECOGNITION APPARATUS, IMAGE RECOGNITION METHOD, AND STORAGE MEDIUM RECORDING IMAGE RECOGNITION PROGRAM

CROSS-REFERENCE TO RELATED APPLICATIONS

This application is based upon and claims the benefit of priority of the prior Japanese Patent Application No. 2007-284294, filed on Oct. 31, 2007, the entire contents of which are incorporated herein by reference.

FIELD OF THE INVENTION

The present invention relates to an image recognition apparatus, an image recognition method, and a storage medium recording an image recognition program.

SUMMARY OF THE INVENTION

An image recognition apparatus according to the present invention recognizes the correspondence between character strings and logical elements composing a logical structure in an image in which the character strings are described as the multiple logical elements to recognize each logical element. The image recognition apparatus includes outputting means for outputting the recognized multiple logical elements when the correspondence is recognized or re-recognized; first determining means for determining a certain logical element among the multiple logical elements to be correct when input of a determination request to determine the logical element is received from a user who recognizes the recognition result output from the outputting means; second determining means for determining the correctness of all the logical elements that are output before the logical element determined by the first determining means and is positioned according to confirmation by the user; and re-recognizing means for re-recognizing the correspondence between logical elements that have not been determined to be correct and the character strings on the basis of the determination content for each logical element determined to be correct by the first determining means and the second determining means.

BRIEF DESCRIPTION OF THE DRAWINGS

FIG. 3 illustrates a form image;

FIGS. 5A and 5B are diagrams for description of a logical-structure-model storage part;

FIG. 6 is a diagram for description a recognition-result display buffer;

FIGS. 8A to 8D are diagrams for description of automatic determination of a logical element;

FIGS. 9A and 9B are diagrams for description of the logical-structure-model storage part (after conversion);

FIGS. 10A and 10B are diagrams for description of an error correction operation;

FIG. 12 is a diagram for description of another recognition result display screen;

FIGS. 13A and 13B are diagrams for description of an outline and features of an image recognition apparatus according to a second embodiment;

FIGS. 15A and 15B are diagrams for description of a recognition-result display buffer and a re-recognition result buffer;

FIGS. 17A and 17B are diagrams for description of another recognition result display screen;

FIGS. 18A and 18B are diagrams for description of an outline and features of an image recognition apparatus according to a third embodiment;

FIGS. 19A and 19B are diagrams for description of the recognition-result display buffer and the re-recognition result buffer;

FIGS. 21A and 21B are diagrams for description of another recognition result display screen.

DESCRIPTION OF THE PREFERRED EMBODIMENTS

Figure 1:
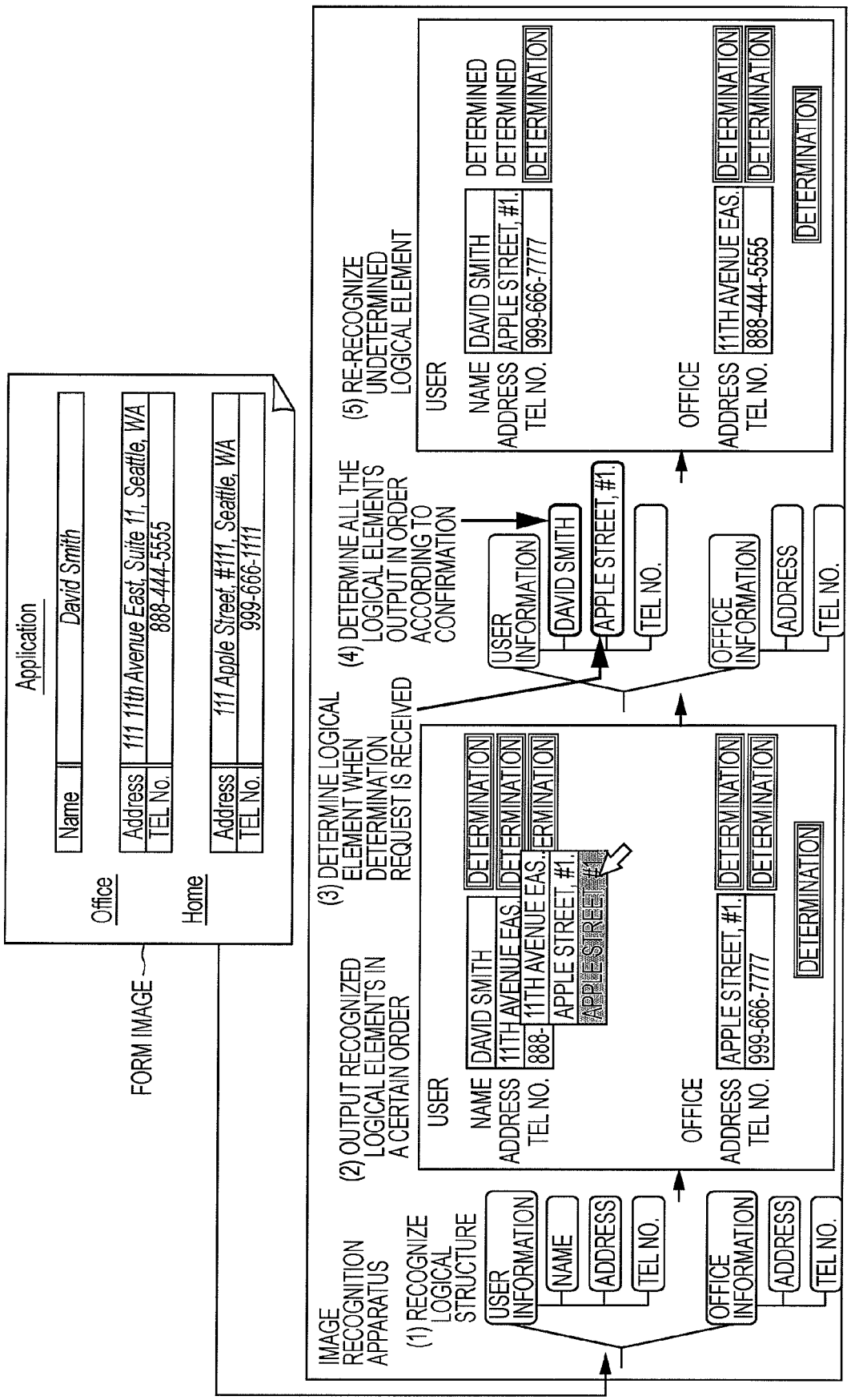
FIG. 1 is a diagram for description of an outline and features of an image recognition apparatus according to a first embodiment.

Computerization of business has been accompanied by the use of many types of computerized documents in recent years. As a result, the importance of image recognition technologies to convert paper documents into computerized documents is increased. The image recognition technologies include optical character readers (OCRs) or optical character recognition (OCR).

However, recognition of documents by the image recognition technologies can produce errors in the recognition results. In such cases, users correct the errors in the recognition results while visually comparing character strings in the input documents with character strings in the recognition results.

Japanese Unexamined Patent Application Publication No. 5-158605 discloses a technology of restricting data items to be input on the basis of data items that have been input in a data input apparatus in which a user sequentially inputs the data items.

The technologies in related art described above have a problem in that the load of the correction operation becomes heavier. For example, assuming that the above correction operation is performed in a bank dealing with many forms varying from customer to customer or varying from transaction to transaction, the correction operation may result in many work hours and increased working loads.

Embodiments of the present invention described below are realized to solve the above problems and reduce the load of the correction operation.

Image recognition apparatuses according to the embodiments of the present invention prevent undetermined logical elements, i.e. logical elements that have not been determined to be correct, from being made worse.

The embodiments of the present invention will herein be described in detail with reference to the attached drawings. Main terms used in the embodiments, an outline of an image recognition apparatus according to a first embodiment, the configuration of the image recognition apparatus according to the first embodiment, and the process in the image recognition apparatus according to the first embodiment will now be described and are followed by other embodiments.

First Embodiment

Description of Terms

Main terms used in the embodiments of the present invention will now be described. An "image" used in the embodiments means an image in which character strings are described as multiple logical elements composing a certain logical structure. For example, an "image" may mean a form image. It is assumed that the form image includes items in which a "name," "address," and "telephone number" are entered as user information, and items in which an "address" and "telephone number" are entered as office information, and it is assumed that a character string is described in each item in the form image. In such a form image, the "logical structure" means a structure in which the "name," "address," and "telephone number" are positioned below the "user information," the "address" and "telephone number" are positioned below the "office information," and the "user information" is positioned in the same hierarchy as that of the "office information." The "name," "address," "telephone number," etc. correspond to the "logical elements" composing the "logical structure." In other words, for example, the "logical structure" is set as the structure formed by the multiple items intentionally or unintentionally and the multiple items are set as the "logical elements" when a creator of the format of a form image creates the format of the form image. When the image recognition apparatus processes the form image, the structure formed by the multiple items in the form image is processed as the "logical structure" and the multiple items are processed as the "logical elements." The "image" is not restricted to the form image and may be any image, such as a questionnaire image, as long as a character string is described in each item.

The "image recognition apparatus" according to the first embodiment recognizes the correspondence between character strings and logical elements to recognize each logical element in such an image. For example, the "image recognition apparatus" recognizes each character string described in a form image by an image recognition technology such as the OCR. In addition, the "image recognition apparatus" recognizes which logical element each character string is described as by using, for example, a logical structure model. For example, the "image recognition apparatus" recognizes a character string "David Smith" that is written by hand as "David Smith" by using an image recognition technology, such as the OCR, and recognizes that the character string "David Smith" is described as a logical element "name" to recognize each logical element in the form image. Such recognition is appropriately referred to as "logical structure recognition" or "recognizing a logical structure" in the embodiments described below.

However, the "image recognition apparatus" does not always recognize the correspondence between the character strings and the logical elements correctly and erroneous recognition results may be obtained. The "image recognition apparatus" may erroneously recognize individual logical elements of a form image. For example, the "image recognition apparatus" may erroneously recognize a character string of a handwritten address "111 11th Avenue East, Suite 11, Seattle, Wash." as "777 11th Avenue East, Suite 11, Seattle, Wash.;" or the "image recognition apparatus" may erroneously recognize an address "111 11th Avenue East, Suite 11, Seattle, Wash." written for the "office" address as a "home" address. In such a case, a correction operation is performed to correct any error in the recognition results. The "image recognition apparatus" according to the first embodiment is provided to reduce the load of the correction operation.

Outline of Image Recognition Apparatus According to First Embodiment

An outline of the image recognition apparatus according to the first embodiment will now be described with reference to FIG. 1. FIG. 1 is a diagram describing the outline of the image recognition apparatus according to the first embodiment.

As described above, the image recognition apparatus according to the first embodiment recognizes the correspondence between character strings and multiple logical elements in an image in which the character strings are described as the logical elements composing a certain logical structure to recognize each logical element in order to reduce the load of the correction operation.

For example, the image recognition apparatus according to the first embodiment recognizes each logical element in a form image shown in the upper half in FIG. 1. Specifically, the image recognition apparatus recognizes the correspondence between character strings and multiple logical elements in the form image in which a character string "name" as user information, character strings "address" and "telephone number" as office information, and character strings "address" and "telephone number" as the user information are described as the logical elements.

As shown in the lower half in FIG. 1, the image recognition apparatus according to the first embodiment stores the logical structure model, which is represented as the concept of a tree structure in FIG. 1, and recognizes the logical structure on the basis of the logical structure model. Specifically, the image recognition apparatus stores the logical structure model that is set so as to correspond to the structure in which the "name," "address," and "telephone number" are positioned below the "user information," the "address" and "telephone number" are positioned below the "office information," and the "user information" is positioned in the same hierarchy as that of the "office information." Positional relationship in which, for example, the "office information" is described below the "user information" is also set in the logical structure model.

In the above structure, when the image recognition apparatus according to the first embodiment recognizes the logical structure of the form image (refer to (1) in FIG. 1), the image recognition apparatus outputs the multiple logical elements, which are the recognition results, to an output unit in a certain order (refer to (2) in FIG. 1). For example, the image recognition apparatus supplies "David Smith" as the "name" in the user information, "11th Avenue East, Suite 11, Seattle, Wash." as the "address" in the user information, "888-444-5555" as the "telephone number" in the user information, "Apple Street, #111, Seattle, Wash." as the "address" in the office information, and "999-666-7777" as the "telephone number" in the office information to the output unit in this order. As apparent from the content of the form image (application) shown in the upper half in FIG. 1, the image recognition apparatus erroneously reverses the "address" and "telephone number" in the user information with the "address" and "telephone number" in the office information.

When the image recognition apparatus receives an input of a determination request to determine a certain logical element to be correct among the multiple logical elements from a user who confirms the recognition results, the image recognition apparatus determines the certain logical element to be correct (refer to (3) in FIG. 1). For example, when the image recognition apparatus receives input of a determination request to determine that the "address" in the user information is not "11th Avenue East, Suite 11, Seattle, Wash." but "Apple Street, #111, Seattle, Wash." from the user, the image recognition apparatus determines the "address" to be correct.

Then, the image recognition apparatus determines the correctness of all the logical elements that are output before the determined certain logical element and that are positioned according to confirmation by the user (refer to (4) in FIG. 1). For example, it is assumed that the user normally confirms the items one by one from the top to the bottom sequentially in the output shown in (2) in FIG. 1. In this case, the logical elements that are output before the determined logical element, the "address" in the user information, and that are positioned according to confirmation by the user mean the logical elements positioned above the "address" in the user information. The "name" in the user information corresponds to the logical element that is output before the determined logical element and to the logical element that is positioned according to confirmation by the user. Accordingly, the image recognition apparatus also determines the "name" in the user information to be correct.

According to the first embodiment, the logical elements determined to be correct in the logical structure model stored in the image recognition apparatus are replaced with the determined character strings, as shown in (3) and (4) in FIG. 1, and the logical structure model itself is converted.

Then, the image recognition apparatus according to the first embodiment re-recognizes the logical structure of the logical elements that have not been determined to be correct on the basis of the content of the determination for the logical elements determined to be correct. Thus, (5) in FIG. 1 is given by outputting the re-recognition results in a certain order in the image recognition apparatus. For example, the image recognition apparatus recognizes the correspondence between the character strings and the logical elements on the basis of the converted logical structure model. Specifically, the image recognition apparatus re-recognizes the "telephone number" in the user information, and the "address" and "telephone number" in the office information to obtain "999-666-7777," "11th Avenue East, Suite 11, Seattle, Wash.," and "888-444-5555" as the results of the re-recognition. As apparent from comparison between the output in (2) in FIG. 1 and the output in (5) in FIG. 1, the output in (2) differs from the output in (5) in the "telephone number" in the user information and the "address" and "telephone number" in the office information. In other words, the content of the determination is reflected in the results of the re-recognition.

The image recognition apparatus according to the first embodiment can reduce the load of the correction operation in the above manner. In the results of the first recognition by the image recognition apparatus in the example shown in FIG. 1, all the information other than the "name" in the user information is erroneously recognized and it is necessary for the user to correct or determine all the items that are erroneously recognized. However, when the "address" in the user information is determined to be correct, the image recognition apparatus according to the first embodiment determines not only the "address" in the user information but also the "name" therein to be correct and re-recognizes such information. As a result, it is possible to reduce the number of items that the user must subsequently determine. In addition, for example, the inconsistency between the "address" in the user information and the "telephone number" therein shows that the "telephone number" in the user information is not correct, and the inconsistency in the "address" in the user information and the "address" in the office information shows that the office information is not correct. Thus, the number of items that the user must subsequently correct can be reduced or even eliminated in some cases.

As described above, when the user determines or corrects a certain logical element, the image recognition apparatus according to the first embodiment refers to the logical structure model with the determined logical element fixed and immediately re-recognizes the logical structure to improve the results of the recognition of other undetermined logical elements. If the number of candidates for the recognition results of the undetermined logical elements is decreased to one, it is possible to determine the logical element. Accordingly, since the results determined or corrected by the user can be used to determine other logical elements, it is possible to reduce the load of the correction operation on the user.

Configuration of Image Recognition Apparatus according to First Embodiment

Figure 2:
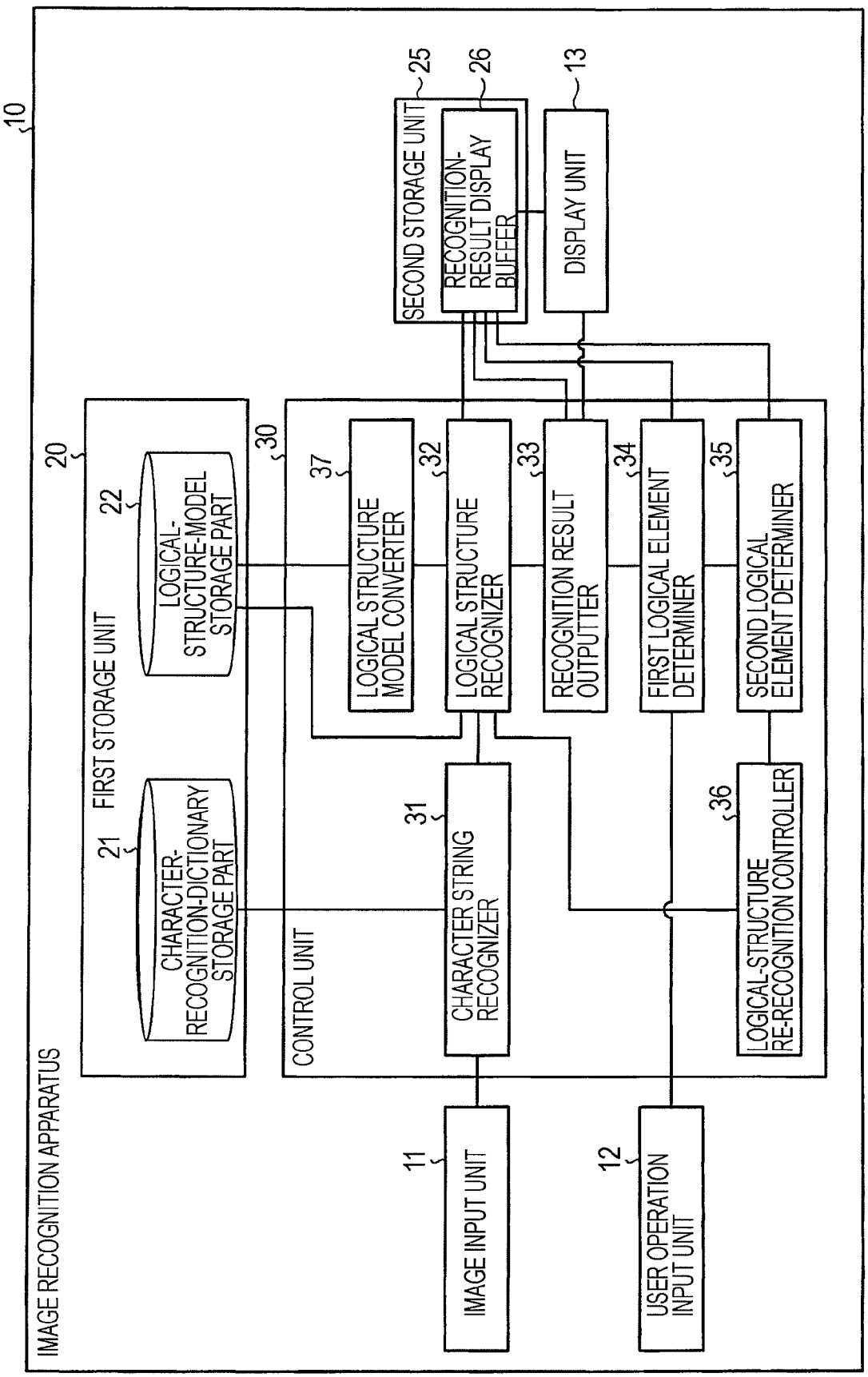
FIG. 2 is a block diagram showing an example of the configuration of the image recognition apparatus according to the first embodiment.
Figure 4:
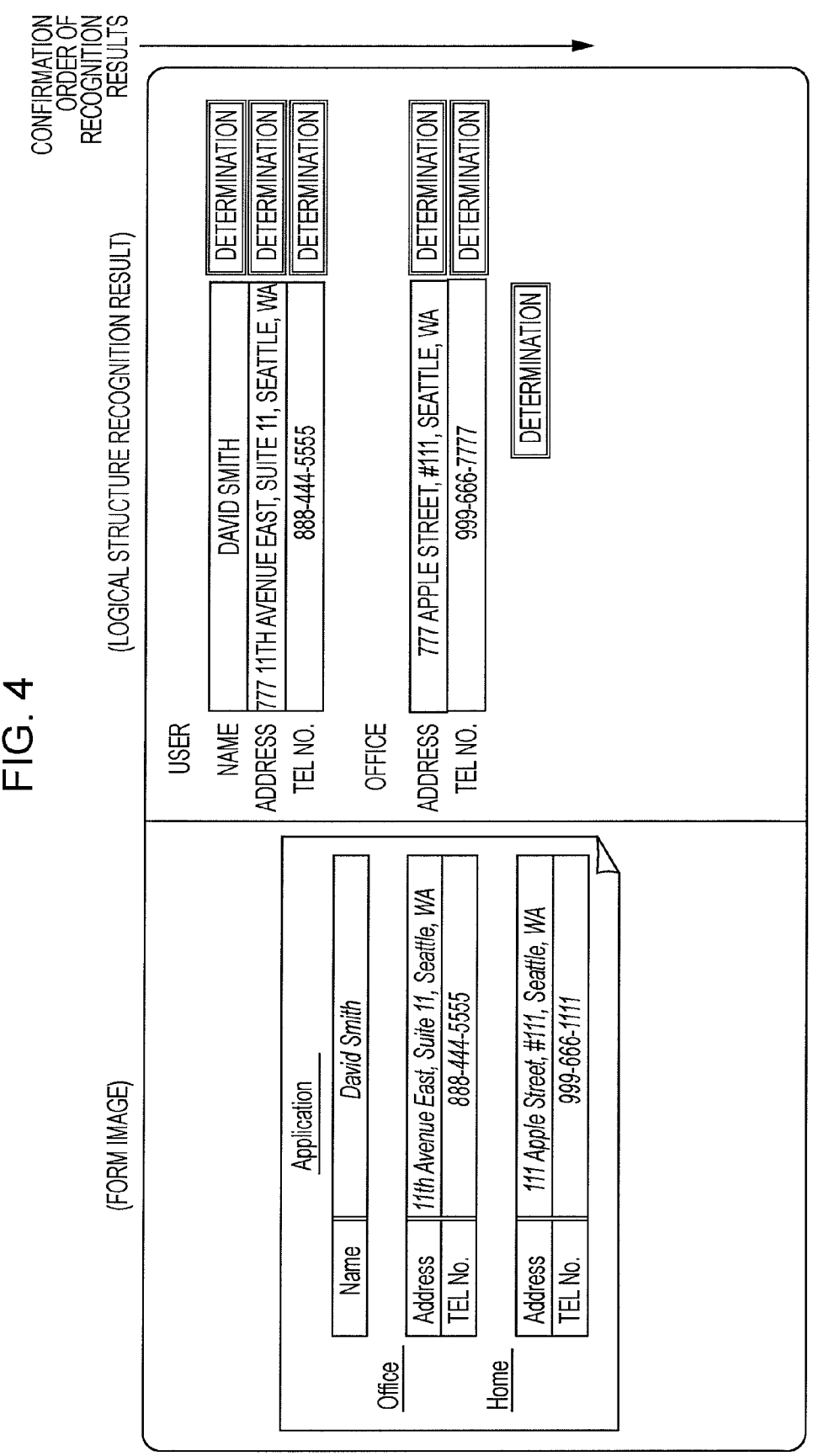
FIG. 4 is a diagram for description of a recognition result display screen.
Figure 7:
FIG. 7 is a diagram for description of an error correction operation.

The image recognition apparatus according to the first embodiment will now be described with reference to FIGS. 2 to 10. FIG. 2 is a block diagram showing an example of the configuration of the image recognition apparatus according to the first embodiment. FIG. 3 illustrates a form image. FIG. 4 is a diagram for description of a recognition result display screen. FIGS. 5A and 5B are diagrams for description of a logical-structure-model storage part. FIG. 6 is a diagram for description a recognition-result display buffer. FIG. 7 is a diagram for description of an error correction operation. FIGS. 8A to 8D are diagrams for description of automatic determination of logical elements. FIGS. 9A and 9B are diagrams for description of the logical-structure-model storage part (after conversion). FIGS. 10A and 10B are diagrams for description of an error correction operation.

Referring to FIG. 2, an image recognition apparatus 10 according to the first embodiment includes an image input unit 11, a user operation input unit 12, a display unit 13, a first storage unit 20, a second storage unit 25, and a control unit 30.

The image input unit 11 receives a form image. Specifically, the image input unit 11 receives a form image to be recognized by the image recognition apparatus 10 and supplies the form image to a character string recognizer 31 described below. For example, the image input unit 11 may be realized by a scanner or may be realized by a function of storing a form image (image data) read by another apparatus in advance in a memory and supplying the form image to the character string recognizer 31.

The form image received by the image input unit 11 will now be described with an example. For example, the image input unit 11 receives a form image shown in FIG. 3. The form image shown in FIG. 3 has a logical structure in which the "name," "address," and "telephone number" are positioned below the "user information," the "address" and "telephone number" are positioned below the "office information," and the "user information" is positioned in the same hierarchy as that of the "office information." The logical structure of the form image shown in FIG. 3 indicates the positional relationship in which the "address" and "telephone number" in the "office information" are described below the "name" in the "user information," below which the "address" and the "telephone number" in the user information are described. The image to be recognized by the image recognition apparatus 10 is not restricted to the form image shown in FIG. 3 and may be any image, such as a questionnaire image in which answers are given to multiple questions, as long as a character string is described in each item. The image to be recognized by the image recognition apparatus 10 is not restricted to an image in which character strings are written by hand, such as the image shown in FIG. 3.

Referring back to FIG. 2, the user operation input unit 12 receives an operation of the user confirming the result of recognition by the image recognition apparatus 10. Specifically, the user operation input unit 12 receives input of a determination request to determine a certain logical element to be correct among the multiple logical elements, and supplies the determination request to a first logical element determiner 34 described below. The user operation input unit 12 is generally realized by a mouse and a keyboard.

The display unit 13 displays the recognition results in the image recognition apparatus 10. Specifically, the display unit 13 displays the recognition results, which are stored in a recognition-result display buffer 26 described below, output by a recognition result outputter 33 described below). The display unit 13 is generally realized by a display device. Note that the display unit 13 corresponds to the "outputter" described in the claims.

The recognition results displayed in the display unit 13 will now be described with an example. For example, the display unit 13 displays a screen shown in the right half in FIG. 4 as the recognition result display screen. A form image to be recognized is shown in the left half in FIG. 4 and recognition results are shown in the right half in FIG. 4. By comparing the left half and the right half of FIG. 4, in the example, it is apparent that the image recognition apparatus 10 erroneously reverses the "address" and "telephone number" in the user information with the "address" and "telephone number" in the office information.

Referring back to FIG. 2, the first storage unit 20, such as a read only memory (ROM) stores data used in various processes performed by the control unit 30. The first storage unit 20 includes a character-recognition-dictionary storage part 21 and a logical-structure-model storage part 22 as components closely related to the first embodiment.

The character-recognition-dictionary storage part 21 stores a dictionary used in recognition of character strings by using the image recognition technology, such as the OCR. Specifically, the character-recognition-dictionary storage part 21 stores a dictionary used in recognition of character strings and the stored dictionary is used in processing by the character string recognizer 31 described below.

The logical-structure-model storage part 22 stores a logical structure model used by the image recognition apparatus 10 to recognize the logical structure of a form image. Specifically, the logical-structure-model storage part 22 stores a logical structure model used in recognition of each logical element in the form image. The stored logical structure model is used in processing by a logical structure recognizer 32 described below. For example, the logical-structure-model storage part 22 stores a logical structure model in which the logical structure and the logical elements are appropriately designed and prepared in advance by a user etc. using the image recognition apparatus 10.

The logical structure model stored in the logical-structure-model storage part 22 will now be described with an example. The logical-structure-model storage part 22 stores, for example, a logical structure model shown in FIGS. 5A and 5B. The logical structure model shown in FIGS. 5A and 5B is conceptually represented by a tree structure, as shown in FIG. 5A, and a table structure, shown in FIG. 5B, is actually stored in the first storage unit 20.

In the table structure shown in FIG. 5B, the type of each logical element is described in each row. The ID number of each logical element, the name of the logical element, the hierarchy of the logical element in the tree structure, the ID number of the parent of the logical element in the tree structure, the positional relationship between the logical elements, an attribute, and the content of a data character string are sequentially described from the left. The positional relationship indicates that, for example, an item "family name" has an item "name" having an "ID=6" at the right side. The relative positional relationship between logical elements is described in the positional relationship. Items having the entities in the tree structure have a "node" attribute and items that do not have the entities and that are collections of semantically related items have a "group" attribute. The character condition that the character string should meet is described for each node. For example, the character types including a "number string" and a "–" are defined for the "telephone number."

Referring back to FIG. 2, the second storage unit 25, such as a random access memory (RAM), stores data used in various processes performed by the control unit 30. The second storage unit 25 includes the recognition-result display buffer 26 as a component closely related to the first embodiment as shown in FIG. 2.

The recognition-result display buffer 26 stores the results of recognition by the image recognition apparatus 10. Specifically, the recognition-result display buffer 26 stores the results of recognition by the character string recognizer 31 and the logical structure recognizer 32 described below. The stored recognition results are used in processing in the recognition result outputter 33 described below and are displayed in the display unit 13.

Recognition results stored in the recognition-result display buffer 26 will now be described with an example. The recognition-result display buffer 26 stores, for example, recognition results shown in FIG. 6. The recognition results, including the candidates, resulting from recognition of character strings of different types of logical elements and the recognition results, including the candidates, indicating which logical element each character string is described as are shown in FIG. 6.

A logical element "family name" in the "name" in the "user information" is recognized as a character string "Smith" and has no other candidate. A logical element "first name" in the "name" in the "user information" is recognized as a first candidate character string "David" and a second candidate character string "Devid." First to fourth candidate character strings are recognized for a logical element "address" in the "user information." The recognition of "777" and "111" in the candidates indicates that the recognition of the character string results in multiple candidates. The recognition of "11th Avenue East, Suite 11, Seattle, Wash." and "Apple Street, #111, Seattle, Wash." in the candidates indicates that the recognition of which logical element each character string is described as results in multiple candidates. The same applies to the other logical elements.

Referring back to FIG. 2, the control unit 30 controls the image recognition apparatus 10 so as to perform various processes. The control unit 30 includes the character string recognizer 31, the logical structure recognizer 32, the recognition result outputter 33, the first logical element determiner 34, a second logical element determiner 35, a logical-structure re-recognition controller 36, and a logical structure model converter 37 as components closely related to the first embodiment. The recognition result outputter 33 corresponds to "outputting means" described in the claims; the first logical element determiner 34 corresponds to "first determining means" described therein; the second logical element determiner 35 corresponds to "second determining means" described therein; and the logical-structure re-recognition controller 36 and the logical structure model converter 37 correspond to "re-recognizing means" described therein.

In the control unit 30, the character string recognizer 31 recognizes a character string by an image recognition technology such as the OCR. Specifically, the character string recognizer 31 recognizes the position of a character string and a candidate (candidates) for the character string by using the dictionary stored in the character-recognition-dictionary storage part 21 in a form image received by the image input unit 11. The recognition results are used in processing by the logical structure recognizer 32.

As described above in the description of the recognition-result display buffer shown in FIG. 6, for example, the recognition of the character string "David" in the form image as the first candidate "David" and the second candidate "Devid" is performed by the character string recognizer 31.

The logical structure recognizer 32 recognizes which logical element each character string is described as. Specifically, the logical structure recognizer 32 refers to the logical structure model stored in the logical-structure-model storage part 22 to associate the content of the logical structure model with the recognition results recognized by the character string recognizer 31. The recognition results are stored in the recognition-result display buffer 26 and are used in processing by the recognition result outputter 33.

As described above in the description of the recognition-result display buffer shown in FIG. 6, for example, the recognition of the logical element "address" in the "user information" as the first to fourth candidates, "777 11th Avenue East, Suite 11, Seattle, Wash.," "111 11th Avenue East, Suite 11, Seattle, Wash.," "777 Apple Street, #111, Seattle, Wash.," and "111 Apple Street, #111, Seattle, Wash." is performed by the logical structure recognizer 32.

The recognition result outputter 33 outputs the multiple logical elements, which are the recognition results, in a certain order. Specifically, when the logical elements, which are the recognition results stored in the recognition-result display buffer 26, are recognized or re-recognized by the character string recognizer 31 and the logical structure recognizer 32, the recognition result outputter 33 displays the logical elements in the display unit 13 in a certain order.

The recognition result outputter 33 outputs, for example, the recognition result display screen shown in FIG. 4, as described above in the description of the display unit 13. The recognition result outputter 33 according to the first embodiment vertically arranges the logical elements to display the logical elements.

The first logical element determiner 34 determines a certain logical element to be correct among the multiple logical elements when input of a determination request to determine the certain logical element to be correct is received. Specifically, when the first logical element determiner 34 receives input of a determination request input with the user operation input unit 12 by the user who confirms the recognition results displayed in the display unit 13 by the recognition result outputter 33 and stored in the recognition-result display buffer 26, the first logical element determiner 34 determines the received logical element to be correct and indicates the logical element determined to be correct to the second logical element determiner 35.

The determination by the first logical element determiner 34 will now be described with an example. For example, it is assumed that a recognition result display screen shown in FIG. 7 is displayed in the display unit 13 by the recognition result outputter 33. It is also assumed that the user who has confirmed the recognition results determines that the character string "777 11th Avenue East, Suite 11, Seattle, Wash." in the "address" in the "user information" is an erroneous item and wants to correct the item to "111 Apple Street, #111, Seattle, Wash." When the user uses the user operation input unit 12, which in this example is a mouse, to move the pointer on "777 11th Avenue East, Suite 11, Seattle, Wash." and right-clicks the erroneous item (refer to (1) in FIG. 7) in order to correct the erroneous item, the subsequent candidate character strings "111 11th Avenue East, Suite 11, Seattle, Wash.," "777 Apple Street, #111, Seattle, Wash.," and "111 Apple Street, #111, Seattle, Wash." are displayed in the window (refer to (2) in FIG. 7). These subsequent candidates are the recognition results stored in the recognition-result display buffer 26 (refer to FIG. 6).

Next, when the user uses the user operation input unit 12 (mouse) to left-click "111 Apple Street, #111, Seattle, Wash.," "111 Apple Street, #111, Seattle, Wash." is entered as the character string for the "address" (not shown in FIG. 7) and, for example, a "determination" icon changes to a word "determined."

The first logical element determiner 34 may determine a specified item to be correct when the user clicks the "determination" icon to explicitly instruct the determination of the specified item, instead of the determination of a corrected item to be correct when the user corrects the erroneous item.

Referring back to FIG. 2, the second logical element determiner 35 determines the correctness of all the logical elements output before a certain logical element. Specifically, when a certain logical element is determined to be correct by the first logical element determiner 34, the second logical element determiner 35 determines the correctness of all the logical elements that are output before the certain logical element and that are positioned according to confirmation by the user and indicates the logical elements determined to be correct to the logical-structure re-recognition controller 36.

It is assumed that the user normally confirms the items one by one from the top to the bottom sequentially in the recognition result display screen shown in FIG. 7. In this case, the logical elements that are output before the determined logical element, the "address" in the user information, and that are positioned according to confirmation by the user mean the logical elements positioned above the "address" in the user information. The "name" in the user information corresponds to the logical element that is output before the determined logical element and that is positioned according to confirmation by the user. Accordingly, the second logical element determiner 35 determines also the "family name" and the "first name" in the user information to be correct. In other words, the second logical element determiner 35 acquires the display order stored in the recognition-result display buffer 26, for example, by counting which rows the logical elements are described in the table, like the one shown in FIG. 6, to learn the row numbers, and determines the correctness of all the logical elements displayed in earlier orders, such as having the small row numbers.

Specifically, the second logical element determiner 35 determines the logical element "address" in the "user information" determined by the first logical element determiner 34, among the recognition results stored in the recognition-result display buffer 26, to be "111 Apple Street, #111, Seattle, Wash." and, for example, assigns a disablement mark to the second and subsequent candidates to substantially delete the candidates. Then, the second logical element determiner 35 determines the logical element "family name" in the "user information" to be "Smith" and the logical element "first name" to be "David" and assigns the disablement mark to the second candidate "Devid" to substantially delete the second candidate. For example, information shown in FIG.

8A is stored in the recognition-result display buffer 26 in which the content of the determination is reflected (the hatched logical elements denote the determined logical elements).

The logical-structure re-recognition controller 36 controls the logical structure recognizer 32 and the logical structure model converter 37 so as to re-recognize the correspondence of the logical elements that have not been determined to be correct on the basis of the determination content of the logical elements. Specifically, the logical-structure re-recognition controller 36 controls the logical structure recognizer 32 and the logical structure model converter 37 so as to cause the logical structure recognizer 32 to re-recognize the correspondence between the logical elements that have not been determined to be correct and the character strings on the basis of the determination content of the logical elements determined to be correct by the first logical element determiner 34 and the second logical element determiner 35.

The logical structure model converter 37 converts the logical structure model. Specifically, the logical structure model converter 37 is controlled by the logical-structure re-recognition controller 36 and reflects the determination content by the first logical element determiner 34 and the second logical element determiner 35 in the logical structure model stored in the logical-structure-model storage part 22. The reflection in the logical structure model means that the determination content is described in the logical structure model to uniquely determine the corresponding character strings.

The logical structure model converted by the logical structure model converter 37 will now be described with examples. The logical-structure-model storage part 22 stores, for example, a logical structure model shown in FIG. 9A resulting from the conversion by the logical structure model converter 37. As apparent from comparison between FIG. 5B and FIG. 9A, the logical structure model converter 37 describes the determined "111 Apple Street, #111, Seattle, Wash.," "Smith," and "David" in the "address," "family name," and "first name," respectively, in the "user information" to uniquely determine the corresponding character strings. The logical structure model is created in which the determined content resulting from the conversion by the logical structure model converter 37 is described.

Referring back to the description of the logical-structure re-recognition controller 36, after causing the logical structure model converter 37 to convert the logical structure model stored in the logical-structure-model storage part 22, the logical-structure re-recognition controller 36 controls the logical structure recognizer 32 so as to perform the re-recognition. The logical structure recognizer 32 refers to the logical structure model subjected to the conversion and stored in the logical-structure-model storage part 22 and associates the content of the logical structure model with the recognition results recognized by the character string recognizer 31. The recognition results are stored in the recognition-result display buffer 26 again and are used in the processing by the recognition result outputter 33.

Specifically, it is assumed that the results of the re-recognition by the logical structure recognizer 32, that is, the recognition results stored in the recognition-result display buffer 26 shown in FIG. 8B, are achieved. In other words, it is assumed that the determination of the "address" in the "user information" restricts the "telephone number" in the "user information" to a number starting with "999," restricts the "address" in the "office information" to an address including "11th Avenue East, Suite 11," and restricts the "telephone number" in the "office information" to a number starting with "888."

In the above case, the recognition result outputter 33 displays a recognition result display screen shown in FIG. 10A in the display unit 13. In the recognition result display screen shown in FIG. 10A, it is noted that the "determination" icons on the right side of the "name" and "address" in the "user information" are changed to the word "determined," which means that the character strings are determined. It is assumed that the user who has confirmed the recognition results determines that the character string "999-666-7777" in the "telephone number" in the "user information" is an erroneous item and wants to correct the item to "999-666-1111" at this time. When the user uses the user operation input unit 12 (mouse) to move the pointer on "999-666-7777" and right-clicks the erroneous item in order to correct the erroneous item, the subsequent candidate character string "999-666-1111" is displayed in the window. Next, when the user uses the user operation input unit 12 (mouse) to left-click "999-666-111," "999-666-1111" is entered as the character string for the "telephone number," and the "determination" icon on the right side of the "telephone number" in the "user information" is changed to the word "determined" as shown in FIG. 10B.

At this time, the second logical element determiner 35 determines the logical element "telephone number" in the "user information" determined by the first logical element determiner 34, among the recognition results stored in the recognition-result display buffer 26, to be "999-666-1111" and assigns the disablement mark to the second candidate to substantially delete the candidate (refer to FIG. 8C).

Then, the logical-structure re-recognition controller 36 causes the logical structure model converter 37 to convert the logical structure model stored in the logical-structure-model storage part 22 (refer to FIG. 9B) and controls the logical structure recognizer 32 so as to perform the re-recognition. However, in this case, the recognition results are not varied (refer to FIG. 8D) and the recognition result outputter 33 keeps the display of the recognition result display screen shown in FIG. 10B.

Process Performed by Image Recognition Apparatus according to First Embodiment

Figure 11:
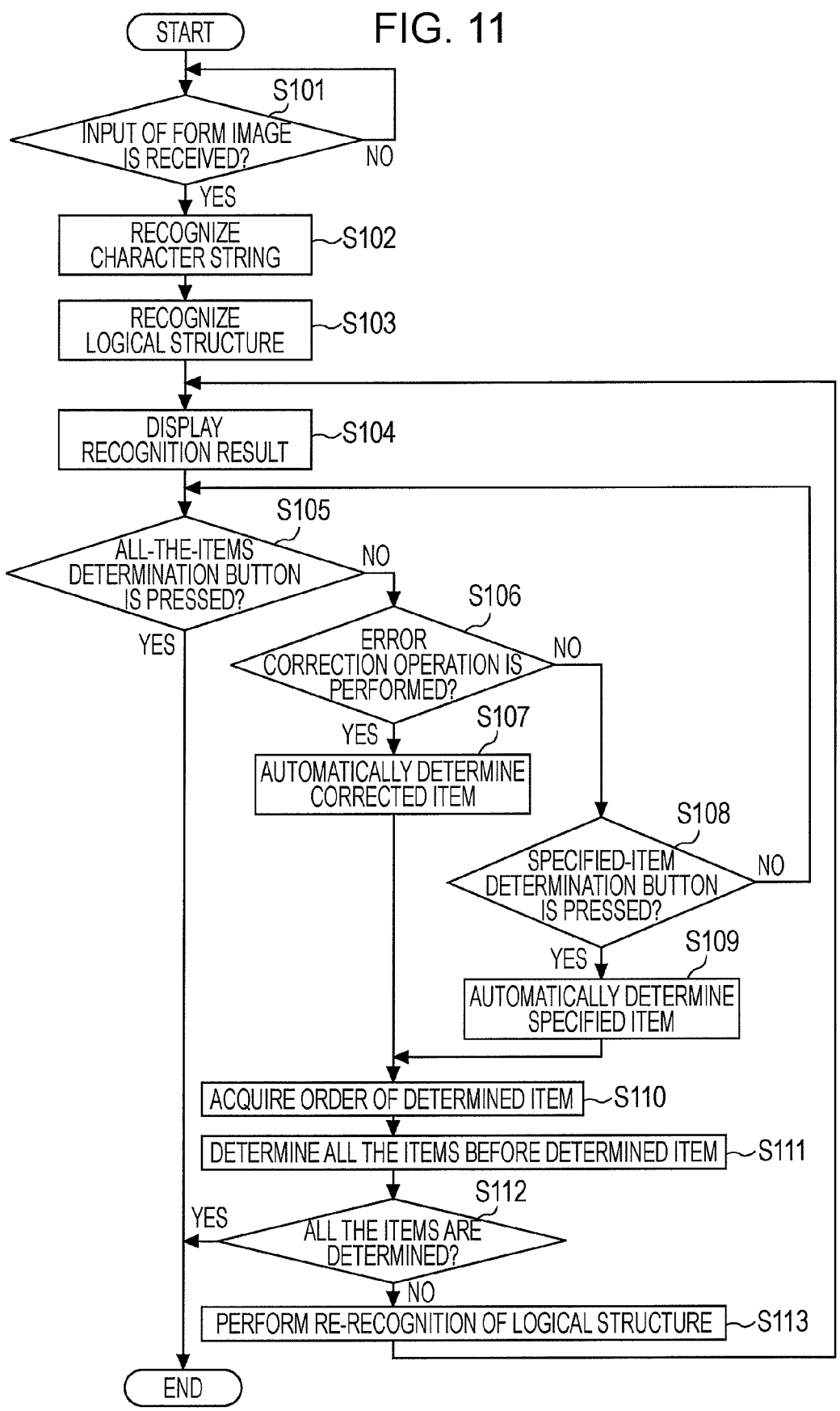
FIG. 11 is a flowchart showing an example of a process performed by the image recognition apparatus according to the first embodiment.

A process performed by the image recognition apparatus according to the first embodiment will now be described with reference to FIG. 11. FIG. 11 is a flowchart showing an example of the process performed by the image recognition apparatus according to the first embodiment.

Referring to FIG. 11, in Step S101, the character string recognizer 31 in the image recognition apparatus 10 determines whether input of a form image is received from the image input unit 11. If input of a form image is received (the determination in Step S101 is affirmative), then in Step S102, the character string recognizer 31 recognizes a character string and supplies the recognition result to the logical structure recognizer 32.

In Step S103, the logical structure recognizer 32 refers to the logical structure model stored in the logical-structure-model storage part 22 and associates the content of the logical structure model with the recognition result recognized by the character string recognizer 31. The logical structure recognizer 32 supplies the recognition result to the recognition result outputter 33.

In Step S104, the recognition result outputter 33 displays the logical elements, which are the recognition results, in the display unit 13 in a certain order.

In Step S105, the first logical element determiner 34 determines whether an all-the-items determination button, for example, the "determination" icon at the bottom in the right half of the recognition result display screen shown in FIG. 4, is pressed. If the all-the-items determination button is pressed (the determination in Step S105 is affirmative), the process is terminated.

If the all-the-items determination button is not pressed (the determination in Step S105 is negative), then in Step S106, the first logical element determiner 34 determines whether an error correction operation is performed. If an error correction operation is performed (the determination in Step S106 is affirmative), then in Step S107, the first logical element determiner 34 determines the correctness of the certain logical element for which the error correction operation is performed and indicates the logical element determined to be correct to the second logical element determiner 35. If an error correction operation is not performed (the determination in Step S106 is negative), then in Step S108, the first logical element determiner 34 determines whether a specified-item determination button, for example, the "determination" icon at the right side of each item in the right half of the recognition result display screen shown in FIG. 4, is pressed. If a specified-item determination button is pressed (the determination in Step S108 is affirmative), then in Step S109, the first logical element determiner 34 determines the logical element for the determined specified item to be correct and indicates the logical element determined to be correct to the second logical element determiner 35.

When a certain logical element is determined to be correct by the first logical element determiner 34 (Steps 107 and 109), the second logical element determiner 35 acquires the displayed order stored in the recognition-result display buffer 26 in Step S110 and acquires the order of the determined items. In Step S111, the second logical element determiner 35 determines the correctness of all the logical elements that are output before the logical element for the determined item and that are positioned according to confirmation by the user and indicates the logical elements determined to be correct to the logical-structure re-recognition controller 36.

In Step S112, the logical-structure re-recognition controller 36 determines whether all the items are determined, for example, whether the all-the-items determination button is pressed by the user. If all the items are not determined (the determination in Step S112 is negative), the logical-structure re-recognition controller 36 causes the logical structure model converter 37 to convert the logical structure model stored in the logical-structure-model storage part 22 and, then in Step S113, the logical-structure re-recognition controller 36 controls the logical structure recognizer 32 so as to perform the re-recognition. At this time, the logical structure recognizer 32 refers to the logical structure model subjected to the conversion to associate the content of the logical structure model with the recognition results recognized by the character string recognizer 31. Then, the process goes back to Step S104.

Another Recognition Result Display Screen According to First Embodiment

Although the recognition result display screen shown in FIG. 4 is described above in the first embodiment, the recognition result display screen is not restricted to the one shown in FIG. 4. For example, a recognition result display screen shown in FIG. 12 may be adopted. As described above, the second logical element determiner 35 determines the correctness of all the logical elements that are output before a certain logical element and that are positioned according to confirmation by the user. The meaning of "orders before a certain logical element, which are positioned according to confirmation by the user" will now be further described.

For example, in the recognition result display screen shown in the lower part in FIG. 12, it is assumed that the user normally confirms the items in a top row in order from the left to the right one by one to the item at the right end of the row. When the last item at the right end of the top row is confirmed, the user normally goes down to a bottom row and confirms the items in order from the left to the right one by one to the item at the right end of the row. Since the "confirmation" here is not accompanied by any operation by the user, the order of the confirmation may be arbitrary. However, the order of the confirmation can be supposed in advance depending on the operation mode or the design of the screen. With this point of view, the image recognition apparatus according to the first embodiment supposes "positioned order according to confirmation by a user before a certain logical element" and, for example, sets the ascending order of the IDs when the recognition results are stored in the recognition-result display buffer set in advance by the user using the image recognition apparatus. In addition, with this point of view, after a certain logical element is determined by the user, all the logical elements that are output before the certain logical element and that are positioned according to confirmation by the user can be considered to be determined.

In the recognition result display screen shown in FIG. 12, when the determined logical element is the "address" of the office, the second logical element determiner 35 considers the "name," "address," and "telephone number" in the user information as the logical elements that are output before the "address" of the office and that are positioned according to confirmation by the user and determines these logical elements to be correct.

As described above, according to the first embodiment of the present invention, it is possible to reduce the load of the correction operation. Specifically, the image recognition apparatus according to the first embodiment refers to the logical structure model with the logical element determined or corrected by the user being fixed to improve the recognition results of other undetermined logical elements. If the number of candidates for the recognition results of the undetermined logical elements is decreased to one, it is possible to determine the logical element. Accordingly, since the result determined or corrected by the user can be used to determine other logical elements, it is possible to reduce the load of the correction operation for the user.

In addition, according to the first embodiment of the present invention, after a certain logical element is determined, the logical elements positioned before the determined logical element are automatically determined. Accordingly, it is possible to automatically determine many undetermined logical elements, thus further reducing the load of the correction operation for the user.

Furthermore, the first embodiment of the present invention is effective in a case where a form image having an unknown format is recognized to register character string data for every item and is useful for improving the efficiency of data entry operations using form images. Consequently, it is possible to facilitate exchange between paper forms and computerized data and to improve the efficiency of operations using paper forms.

Second Embodiment

The method of immediately reflecting the results of re-recognition in the recognition result display screen when the image recognition apparatus re-recognizes a form image is described in the first embodiment of the present invention. However, a method of displaying information indicating that the results of re-recognition differ from the recognition results currently displayed in the output unit may be adopted, instead of immediately reflecting the re-recognition results in the recognition result display screen. Such a method is described as a second embodiment of the present invention.

Outline of Image Recognition Apparatus According to Second Embodiment

An outline and features of the image recognition apparatus according to the second embodiment will now be described with reference to FIGS. 13A and 13B. FIGS. 13A and 13B are diagrams that describe the outline of the image recognition apparatus according to the second embodiment.

Re-recognition of a form image by the image recognition apparatus can improve the recognition results of undetermined logical elements. In other words, from the user's point of view, correction of one item automatically corrects the recognition results of other items. For example, it is assumed that multiple logical elements that are displayed include one erroneous item. In this case, it is natural to consider that the correction of the one erroneous item by the user makes all the recognition results correct. However, undetermined correct items that are correctly displayed can be changed to erroneous items when the re-recognition is performed after the user corrects the erroneous item. Although the re-recognition can often improve the recognition results, it is not possible to deny the possibility of making the correct results worse. In other words, the automatic change of undetermined logical elements may reduce the usability for the user.

In order to resolve the above problem, as shown in FIGS. 13A and 13B, when the re-recognition performed after an erroneous item is corrected results in a change in the recognition result of the first candidate for an undetermined logical element, the image recognition apparatus according to the second embodiment does not simply change the character string of the item but highlights the changed recognition result.

Specifically, when the re-recognition is performed after the erroneous item "address" in the user information is changed from "777 11th Avenue East, Suite 11, Seattle, Wash." to "111 Apple Street, #111, Seattle, Wash." as shown in FIG. 13A to change the recognition result of the first candidate for the "telephone number" in the user information, which is an undetermined logical element, from "888-444-5555" to "999-666-7777", the image recognition apparatus highlights the recognition results that are changed, as shown in FIG. 13B, instead of simply changing the character strings of the items. Since it is sufficient for the user to focus on confirmation of the highlighted items, reduction in the operation load can be expected.

Configuration of Image Recognition Apparatus According to Second Embodiment

Figure 14:
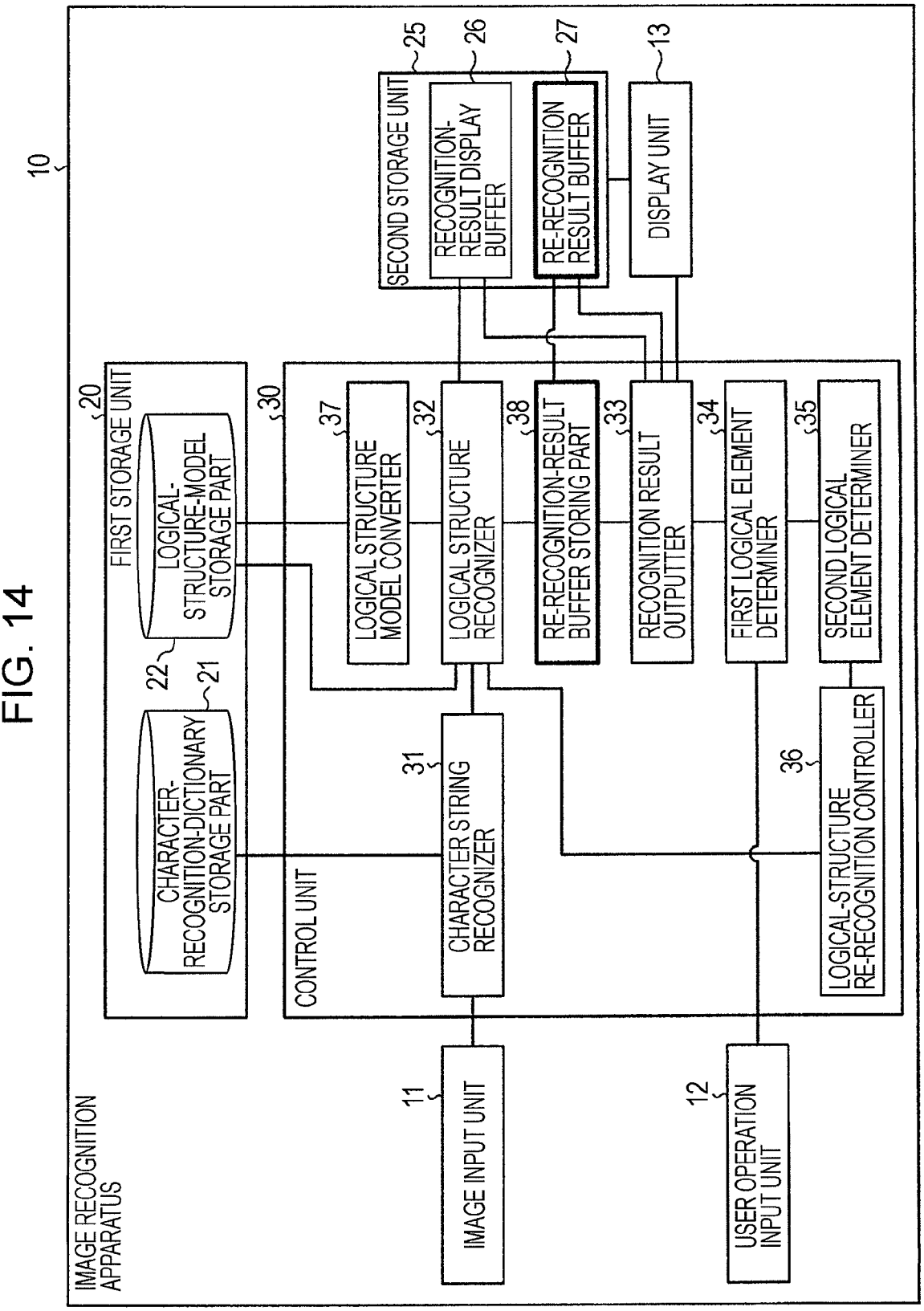
FIG. 14 is a block diagram showing an example of the configuration of the image recognition apparatus according to the second embodiment.

The configuration of the image recognition apparatus according to the second embodiment will now be described with reference to FIG. 14. FIG. 14 is a block diagram showing an example of the configuration of the image recognition apparatus according to the second embodiment.

In the block diagram shown in FIG. 14, components surrounded by thick lines are added to the components in the image recognition apparatus according to the first embodiment. Specifically, an image recognition apparatus 10 according to the second embodiment includes a re-recognition-result buffer storing part 38 in the control unit 30 and a re-recognition result buffer 27 in the second storage unit 25, in addition to the components in the image recognition apparatus according to the first embodiment.

The re-recognition-result buffer storing part 38 stores the results of re-recognition in the re-recognition result buffer 27. The re-recognition result buffer 27 is a memory area having a configuration similar to that of the recognition-result display buffer 26. For example, information shown in FIG. 15B is stored in the re-recognition result buffer 27.

When outputting the results of re-recognition, the recognition result outputter 33 compares the re-recognition results stored in the re-recognition result buffer 27 by the re-recognition-result buffer storing part 38 (refer to FIG. 15B) with the recognition results currently displayed in the display unit 13 (refer to FIG. 15A) for every logical element. If the re-recognition results of logical elements stored in the re-recognition result buffer 27 do not coincide with the recognition results currently displayed in the display unit 13, the recognition result outputter 33 highlights the re-recognition results stored in the re-recognition result buffer 27 to indicate that the results of the re-recognition differ from the recognition results currently displayed in the display unit 13.

Process Performed by Image Recognition Apparatus according to Second Embodiment

Figure 16:
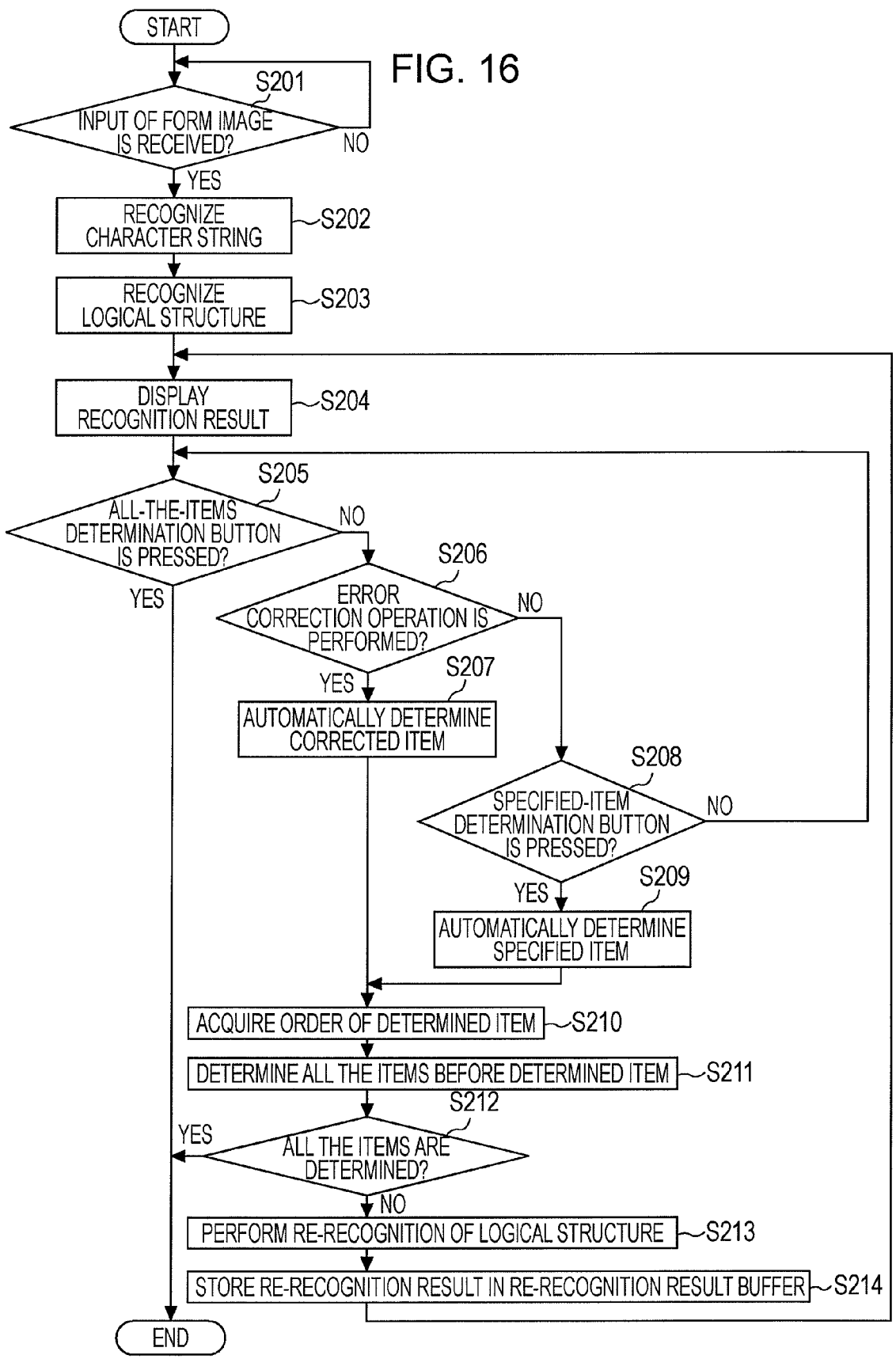
FIG. 16 is a flowchart showing an example of a process performed by the image recognition apparatus according to the second embodiment.

A process performed by the image recognition apparatus according to the second embodiment will now be described with reference to FIG. 16. FIG. 16 is a flowchart showing an example of the process performed by the image recognition apparatus according to the second embodiment.

As apparent from comparison between FIG. 11 and FIG. 16, the process performed by the image recognition apparatus according to the second embodiment differs from the process performed by the image recognition apparatus according to the first embodiment only in that Step S214 is added.

Specifically, in the image recognition apparatus according to the second embodiment, in Step S212, the logical-structure re-recognition controller 36 determines whether or not all the items are determined. If not all the items are determined (the determination in Step S212 is negative), the logical-structure re-recognition controller 36 causes the logical structure model converter 37 to convert the logical structure model stored in the logical-structure-model storage part 22 and, then in Step S213, the logical-structure re-recognition controller 36 controls the logical structure recognizer 32 so as to perform the re-recognition. In Step S214, the re-recognition-result buffer storing part 38 stores the results of the re-recognition in the re-recognition result buffer 27.

Then in Step S204, the recognition result outputter 33 compares the re-recognition results stored in the re-recognition result buffer 27 with the recognition results stored in the recognition-result display buffer 26 for every logical element. If the re-recognition results of logical elements stored in the re-recognition result buffer 27 do not coincide with the recognition results stored in the recognition-result display buffer 26, the recognition result outputter 33 highlights the re-recognition results stored in the re-recognition result buffer 27 to indicate that the results of the re-recognition differ from the recognition results currently displayed in the display unit 13.

Another Recognition Result Display Screen According to Second Embodiment

Although the recognition result display screen described above with reference to FIGS. 13A and 13B is assumed as the recognition result display screen in the second embodiment, the recognition result display screen is not restricted to the one described above with reference to FIGS. 13A and 13B. For example, a recognition result display screen described with reference to FIGS. 17A and 17B may be adopted. Specifically, as shown in FIGS. 17A and 17B, the image recognition apparatus reflects the re-recognition results in the candidates for the character strings displayed when undetermined logical elements are selected without changing the display of the undetermined logical elements even after an erroneous item is corrected.

For example, when the re-recognition is performed after an erroneous item "address" in the user information is changed from "777 11th Avenue East, Suite 11, Seattle, Wash." to "111 Apple Street, #111, Seattle, Wash." as shown in FIG. 17A to change the recognition result of the first candidate for an undetermined logical element "telephone number" in the user information from "888-444-5555" to "999-666-7777," the image recognition apparatus does not immediately change the output of the "telephone number" in the user information. The image recognition apparatus keeps the display of "888-444-5555" and reflects the result of the re-recognition ("999-666-7777") in the candidates for the character strings displayed when the undetermined logical element "telephone number" in the user information is selected (refer to FIG. 17B).

In this case, the result of the re-recognition is not immediately stored in the recognition-result display buffer 26 and is not displayed in the display unit 13 even after the re-recognition is performed; in other words, the result of the re-recognition is not presented to the user. When the user selects an item to correct the recognition result of the item, the correction of the item is indicated to the recognition result outputter 33 in which only the item selected by the user is copied from the re-recognition result buffer 27 to the recognition-result display buffer 26. Only the result of the re-recognition of the item selected by user for the error correction is presented in the above manner.

As described above, according to the second embodiment of the present invention, it is possible to prevent undetermined logical elements (logical elements that have not been determined to be correct) from being made worse.

Third Embodiment

The method is described in the second embodiment in which, when the image recognition apparatus receives input of a determination request to determine a certain logical element from the user, the image recognition apparatus determines all the logical elements output before the certain logical element to be correct to perform the re-recognition and temporarily stores the results of the re-recognition in the buffer. However, the method of "temporarily storing the results of the re-recognition in the buffer" is also applicable to a case where the image recognition apparatus performs the re-recognition while individually determining the logical elements.

In other words, the use of only the method of "temporarily storing the result of the re-recognition in the buffer" has the advantages of reducing the load of the correction operation for the user and preventing an undetermined logical element from being made worse. Accordingly, the method can be adopted regardless of whether the image recognition apparatus individually determines the logical elements or whether all the logical elements positioned before a certain logical element are automatically determined.

Outline of Image Recognition Apparatus According to Third Embodiment

An outline and features of an image recognition apparatus according to a third embodiment of the present invention will now be described with reference to FIGS. 18A and 18B and FIGS. 19A and 19B. FIGS. 18A and 18B are diagrams for description of an outline and features of the image recognition apparatus according to the third embodiment. FIGS. 19A and 19B are diagrams for description of the recognition-result display buffer and the re-recognition result buffer.

The image recognition apparatus according to the third embodiment displays, for example, a recognition result display screen shown in FIGS. 18A and 18B in the display unit 13. In the recognition result display screen shown in FIG. 18A, it is assumed that the user who has confirmed the recognition result determines the character string "777 11th Avenue East, Suite 11, Seattle, Wash." for the "address" in the user information to be an erroneous item and corrects the item to "111 Apple Street, #111, Seattle, Wash." FIG. 18B shows a recognition result display screen resulting from the correction. It is noted that the "determination" icon is kept displayed at the right side of the "name" in the "user information" and is not changed to the word "determined."

In other words, even when the image recognition apparatus according to the third embodiment receives input of a determination request to determine a certain logical element (the "address" in the user information") to be correct, the image recognition apparatus does not determine the correctness of the logical element (the "name" in the user information) output in a positioned order according to confirmation by a user before a certain logical element, but the image recognition apparatus processes the logical element as an undetermined logical element.

It is also noted that the "telephone number" in the user information and the "address" and "telephone number" in the office information are highlighted in FIG. 18B.

When the re-recognition is performed after the "address" in the user information is changed from "777 11th Avenue East, Suite 11, Seattle, Wash." to "111 Apple Street, #111, Seattle, Wash.," the image recognition apparatus according to the third embodiment does not highlight the undetermined logical element whose recognition result is not changed (the "name" in the user information). Instead, the image recognition apparatus according to the third embodiment highlights the undetermined logical elements whose recognition results are changed (the "telephone number" in the user information and the "address" and "telephone number" in the office information).

The recognition-result display buffer 26 and the re-recognition result buffer 27 at this time will now be described with reference to FIGS. 19A and 19B. FIG. 19A shows the recognition-result display buffer 26 after the user has determined the "address" in the user information before the "address" in the user information is re-recognized. In the recognition-result display buffer 26 shown in FIG. 19A, the "family name" and "first name" in the user information are not recognized as the determined logical elements. FIG. 19B shows the re-recognition result buffer 27 after the user has determined the "address" in the user information and the re-recognition has been performed. In the re-recognition result buffer 27 shown in FIG. 19B, only the logical elements whose first candidates are different from those in the recognition-result display buffer 26 in FIG. 19A (only the "telephone number" in the user information and the "address" and "telephone number" in the office information") are highlighted.

Process Performed by Image Recognition Apparatus According to Third Embodiment

Figure 20:
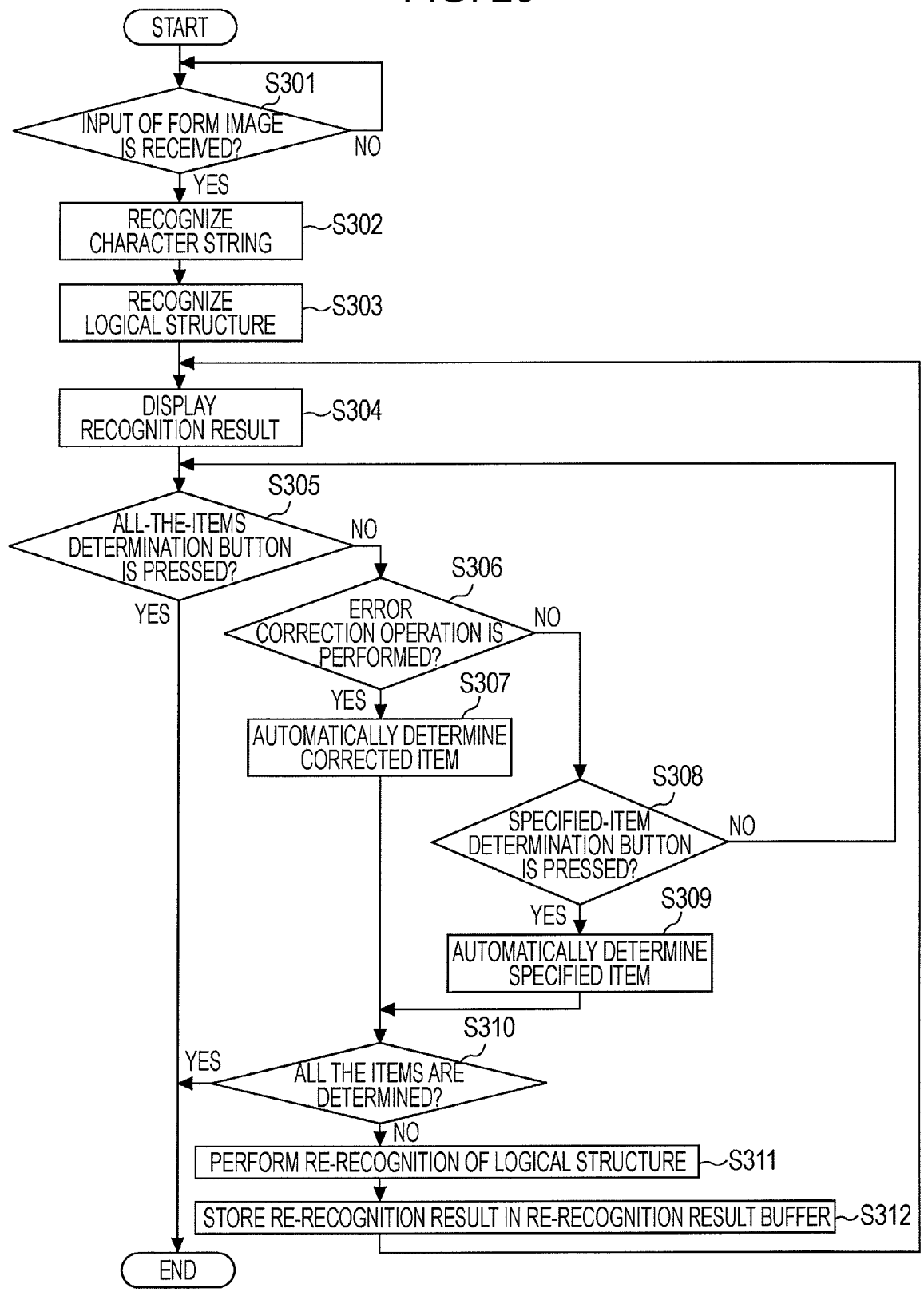
FIG. 20 is a flowchart showing an example of a process performed by the image recognition apparatus according to the third embodiment.

A process performed by the image recognition apparatus according to the third embodiment will now be described with reference to FIG. 20. FIG. 20 is a flowchart showing an example of the process performed by the image recognition apparatus according to the third embodiment.

As apparent from comparison between FIG. 16 and FIG. 20, the process performed by the image recognition apparatus according to the third embodiment differs from the process performed by the image recognition apparatus according to the second embodiment only in that Steps S210 and S211 in FIG. 16 are deleted because the second logical element determiner 35 is not needed.

Specifically, in the image recognition apparatus according to the third embodiment, in Step S305, the first logical element determiner 34 determines whether the all-the-items determination button is pressed. If the all-the-items determination button is not pressed (the determination in Step S305 is negative), then in Step S306, the first logical element determiner 34 determines whether an error correction operation is performed or not. If an error correction operation is performed (the determination in Step S306 is affirmative), then in Step S307, the first logical element determiner 34 determines the correctness of the certain logical element for which the error correction operation is performed and indicates the certain logical element determined to be correct to the logical-structure re-recognition controller 36.

If an error correction operation is not performed (the determination in Step S306 is negative), then in Step S308, the first logical element determiner 34 determines whether or not a specified-item determination button is pressed. If a specified-item determination button is pressed (the determination in Step S308 is affirmative), then in Step S309, the first logical element determiner 34 determines the logical element for the determined specified item to be correct and indicates the logical element determined to be correct to the logical-structure re-recognition controller 36.

In Step S310, the logical-structure re-recognition controller 36 determines whether or not all the items are determined. If not all the items are determined (the determination in Step S310 is negative), the logical-structure re-recognition controller 36 causes the logical structure model converter 37 to convert the logical structure model stored in the logical-structure-model storage part 22, and then in Step S311, the logical-structure re-recognition controller 36 controls the logical structure recognizer 32 so as to perform the re-recognition. In Step S312, the re-recognition-result buffer storing part 38 stores the results of the re-recognition in the re-recognition result buffer 27.

Then in Step S304, the recognition result outputter 33 compares the re-recognition results stored in the re-recognition result buffer 27 with the recognition results stored in the recognition-result display buffer 26 for every logical element. If the re-recognition results of logical elements stored in the re-recognition result buffer 27 do not coincide with the recognition results stored in the recognition-result display buffer 26, the recognition result outputter 33 highlights the re-recognition results stored in the re-recognition result buffer 27 to indicate that the results of the re-recognition differ from the recognition results currently displayed in the display unit 13.

Another Recognition Result Display Screen According to Third Embodiment

Although the recognition result display screen described above with reference to FIGS. 18A and 18B is assumed as the recognition result display screen in the third embodiment, the recognition result display screen is not restricted to the one described above with reference to FIGS. 18A and 18B. For example, a recognition result display screen described with reference to FIGS. 21A and 21B may be adopted. Specifically, as shown in FIGS. 21A and 21B, the image recognition apparatus reflects the re-recognition results in the candidates for the character strings displayed when undetermined logical elements are selected without changing the display of the undetermined logical elements even after an erroneous item is corrected.

Also in this case, as shown in FIG. 21B, it is noted that the "determination" icon is kept displayed at the right side of the "name" in the "user information" and is not changed to the word "determined."

As described above, according to the third embodiment of the present invention, it is possible to reduce the load of the correction operation. Specifically, the image recognition apparatus according to the third embodiment refers to the logical structure model with the logical element determined or corrected by the user being fixed to improve the recognition results of other undetermined logical elements. If the number of candidates for the recognition results of the undetermined logical elements is decreased to one, it is possible to determine the logical element. Accordingly, since the result determined or corrected by the user can be used to determine other logical elements, it is possible to reduce the load of the correction operation for the user.

In addition, the third embodiment of the present invention is effective in a case where a form image having an unknown format is recognized to register character string data for every item and is useful for improving the efficiency of data entry operations using form images. Consequently, it is possible to facilitate exchange between paper forms and computerized data and to improve the efficiency of operations using paper forms.

Furthermore, according to the third embodiment of the present invention, it is possible to prevent undetermined logical elements, i.e. logical elements that have not been determined to be correct, from being made worse.

Fourth Embodiment

The present invention may be embodied by various embodiments other than the embodiments described above.

Although the image recognition apparatus includes the logical-structure re-recognition controller and controls the logical structure recognizer so as to perform the re-recognition after causing the logical structure model converter to convert the logical structure model in the above embodiments, the present invention is not restricted to the above method. Any method of re-recognizing the logical structure of undetermined logical elements on the basis of the determination content of determined logical elements may be adopted.

Among the processes described in the above embodiments, all or some of the processes described as automatically performed may be manually performed, and all or some of the processes described as manually performed may be automatically performed. In addition, the processes (FIGS. 11, 16, and 20), the control processes, the specific names, information including a variety of data and parameters shown in the above description, and the drawings may be arbitrarily varied if not otherwise specified.

The components in the apparatuses shown in the drawings are functional concepts and may not necessarily be structured physically as shown in the drawings (such as FIG. 2 and FIG. 14). Specifically, the specific modes of distribution and integration of each apparatus are not restricted to the ones shown in the drawings. All or some of the specific modes may be functionally or physically distributed or integrated in arbitrary units depending on various loads and usages. In addition, all or some of the processes and functions performed in each apparatus may be realized by the central processing unit (CPU) of each apparatus and programs analyzed and executed by the CPU, or may be realized by hard-wired logic.

Figure 22:
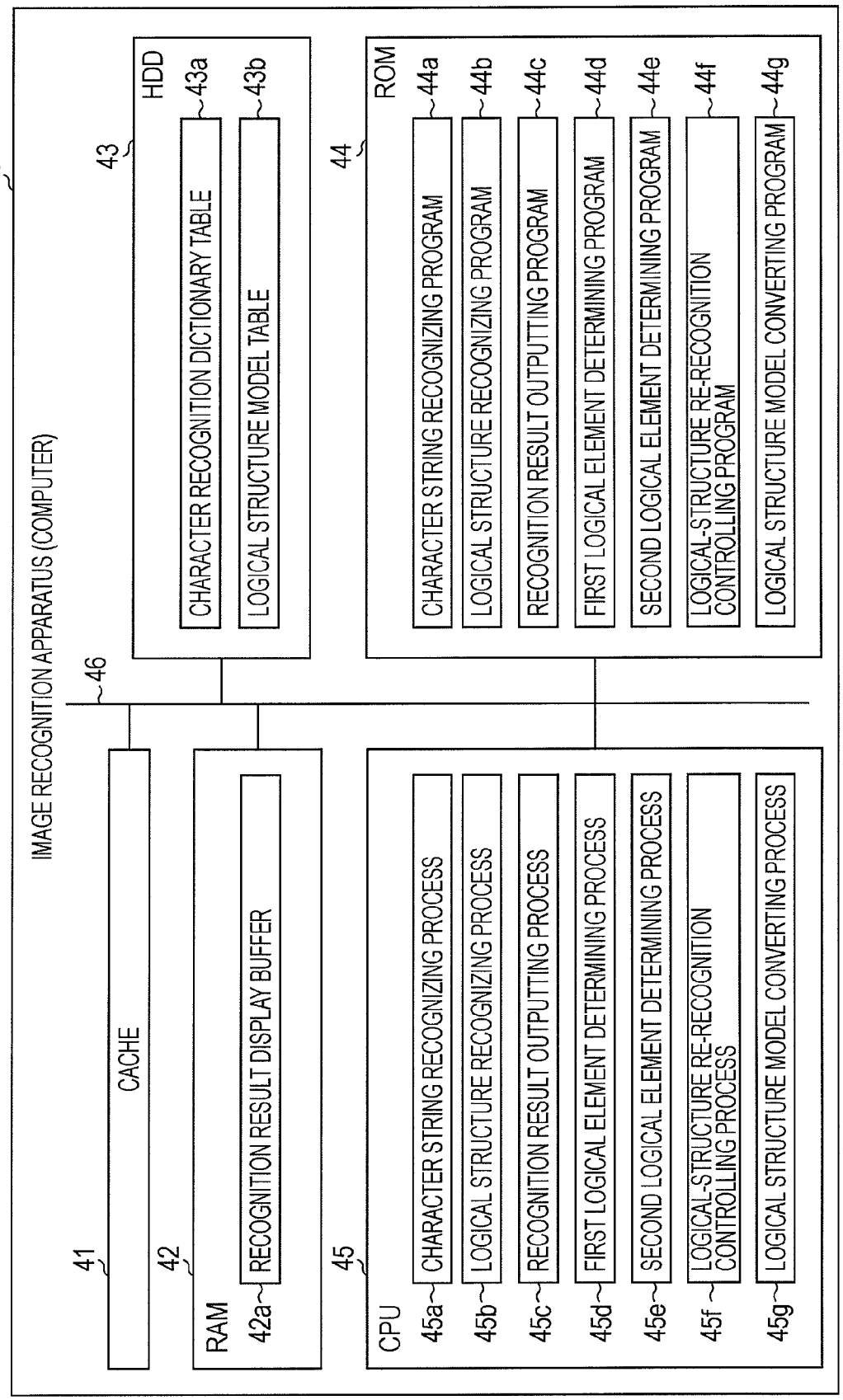
FIG. 22 is a block diagram showing an example of the configuration of a computer executing an image recognition program.

The various processes described in the above embodiments can be realized by a computer, such as a personal computer or a workstation, executing programs prepared in advance. An example of a computer executing an image recognition program having a function similar to the one according to the first embodiment will now be described with reference to FIG. 22. FIG. 22 is a block diagram showing an example of the configuration of a computer executing the image recognition program.

Referring to FIG. 22, an image recognition apparatus (computer) 40 includes a cache 41, a RAM 42, a hard disk drive (HDD), a ROM 44, and a CPU 45 connected to each other via a bus 46. An image recognition program having a function similar to the one according to the first embodiment is stored in the ROM 44 in advance. Specifically, as shown in FIG. 22, a character string recognizing program 44a, a logical structure recognizing program 44b, a recognition result outputting program 44c, a first logical element determining program 44d, a second logical element determining program 44e, a logical-structure re-recognition controlling program 44f, and a logical structure model converting program 44g are stored in the ROM 44.

The CPU 45 reads out and executes the programs from the character string recognizing program 44a to the logical structure model converting program 44g to perform a character string recognizing process 45a, a logical structure recognizing process 45b, a recognition result outputting process 45c, a first logical element determining process 45d, a second logical element determining process 45e, a logical-structure re-recognition controlling process 45f, and a logical structure model converting process 45g, as shown in FIG. 22. The processes from the character string recognizing process 45a to the logical structure model converting program 44g correspond to the character string recognizer 31, the logical structure recognizer 32, the recognition result outputter 33, the first logical element determiner 34, the second logical element determiner 35, the logical-structure re-recognition controller 36, and the logical structure model converter 37, respectively, shown in FIG. 2.

The HDD 43 includes a character recognition dictionary table 43a and a logical structure model table 43b, as shown in FIG. 22. The character recognition dictionary table 43a and the logical structure model table 43b correspond to the character-recognition-dictionary storage part 21 and the logical-structure-model storage part 22, respectively, shown in FIG. 2. The RAM 42 includes a recognition result display buffer 42a as shown in FIG. 22.

The programs from the character string recognizing program 44a to the logical structure model converting program 44g may not necessarily be stored in the ROM 44. For example, the programs may be stored in a "portable physical medium," such as a flexible disk (FD), a compact disk-read only memory (CD-ROM), a magneto-optical (MO) disk, a digital versatile disk (DVD), or an integrated circuit (IC) card, loaded in the computer 40, a "fixed physical medium," such as an HDD, externally or internally provided in the computer 40, or "another computer (or server)" connected to the computer 40 via a public circuit, the Internet, a local area network (LAN), or a wide area network (WAN). In this case, the computer 40 reads out and executes the programs from the "portable physical medium," "fixed physical medium," or "another computer (or server)."

What is claimed is:

1. An image recognition apparatus recognizing a correspondence between character strings and logical elements composing a logical structure, in an image in which the character strings are described as the multiple logical elements, to recognize each logical element, the image recognition apparatus comprising:
    a processor; and
    a memory which stores a plurality of instructions, which when executed by the processor, cause the processor to execute,
    outputting the recognized multiple logical elements when the correspondence is recognized or re-recognized;
    first determining the correctness of a certain first logical element among the multiple logical elements when input of a first determination request to determine the first logical element is received from a user who recognizes the recognition result output from the outputting;
    second determining the correctness of all the logical elements that are output before the first logical element determined by the first determining and is positioned according to the first determination request input by the user; and
    re-recognizing the correspondence between logical elements that are output after the first logical element and have not been determined to be correct and the character strings, on the basis of the first determination request for the first logical element determined to be correct by the first determining and the second determining.

2. The image recognition apparatus according to claim 1:
    wherein the processor further executes storing the recognition result recognized by the re-recognizing; and
    wherein the outputting compares the recognition result stored by the storing with the recognition result currently displayed for every logical element when the re-recognition result by the re-recognizing is output, and outputs information indicating that the re-recognition result by the re-recognizing does not coincide with the recognition result currently displayed for a logical element for which the recognition result stored by the storing does not coincide with the recognition result currently displayed.

3. An image recognition method of recognizing the correspondence between character strings and logical elements composing a logical structure in an image in which the character strings are described as the multiple logical elements to recognize each logical element, the image recognition method comprising:
    outputting the recognized multiple logical elements when the correspondence is recognized or re-recognized;
    firstly determining a certain first logical element among the multiple logical elements to be correct when input of a first determination request to determine the first logical element is received from a user who recognizes the recognition result output from the outputting;
    secondly determining the correctness of all the logical elements that are output before the first logical element determined by the first determining and is positioned according to the first determination request input by the user; and
    re-recognizing the correspondence between logical elements that are output after the first logical element have not been determined to be correct and the character strings on the basis of the first determination request for the first logical element determined to be correct by the first determining and the second determining.

4. The image recognition method according to claim 3, further comprising:
    storing the recognition result recognized by the re-recognizing,
    wherein the outputting compares the recognition result stored by the storing with the recognition result currently displayed for every logical element when the re-recognition result by the re-recognizing is output and outputs information indicating that the re-recognition result by the re-recognizing does not coincide with the recognition result currently displayed for a logical element for which the recognition result stored by the storing does not coincide with the recognition result currently displayed.

5. A non-transitory computer recording medium in which an image recognition program is recorded, the image recognition program causing a computer to execute a method of recognizing the correspondence between character strings and logical elements composing a logical structure in an image in which the character strings are described as the multiple logical elements to recognize each logical element, the image recognition program comprising the steps of:

outputting the recognized multiple logical elements when the correspondence is recognized or re-recognized;

firstly determining the correctness of a certain first logical element among the multiple logical elements when input of a first determination request to determine the first logical element is received from a user who recognizes the recognition result output from the outputting;

secondly determining the correctness of all the logical elements that are output before the first logical element determined by the first determining and is positioned according to the first determination request input by the user; and re-recognizing the correspondence between logical elements that are output after the first logical element have not been determined to be correct and the character strings on the basis of the first determination request for the first logical element determined to be correct by the first determining and the second determining.

6. The non-transitory computer recording medium in which the image recognition program is recorded according to claim 5, the image recognition program further comprising the step of:

storing the recognition result recognized by the re-recognizing, wherein the outputting compares the recognition result stored by the storing with the recognition result currently displayed for every logical element when the re-recognition result by the re-recognizing is output and outputs information indicating that the re-recognition result by the re-recognizing does not coincide with the recognition result currently displayed for a logical element for which the recognition result stored by the storing does not coincide with the recognition result currently displayed.

* * * * *